US005832244A

United States Patent [19]

Jolley et al.

[11] Patent Number: 5,832,244

[45] Date of Patent: Nov. 3, 1998

[54] MULTIPLE INTERFACE INPUT/OUTPUT PORT FOR A PERIPHERAL DEVICE

[75] Inventors: David Lee Jolley, Kaysville; William Paul Baker, Salt Lake City; Rick L. Johnson, Ogden; Jon Newman, Centerville, all of Utah

[73] Assignee: Iomega Corporation, Roy, Utah

[21] Appl. No.: 604,499

[22] Filed: Feb. 20, 1996

[51] Int. Cl.[6] ...................... H01J 13/00

[52] U.S. Cl. ...................... 395/309; 395/306; 395/308; 395/828; 395/836; 395/858; 395/500

[58] Field of Search ...................... 395/309, 307, 395/308, 828, 835, 836, 882, 886, 889, 890, 891, 883, 281, 282, 283, 285, 311, 500, 527

[56] References Cited

U.S. PATENT DOCUMENTS

| | | | |
|---|---|---|---|
| 4,603,320 | 7/1986 | Farago | 340/347 DD |
| 4,864,291 | 9/1989 | Korpi | 340/825.5 |
| 4,972,470 | 11/1990 | Farago | 380/3 |
| 5,031,115 | 7/1991 | Hayashi | 364/519 |
| 5,099,137 | 3/1992 | Lattin, Jr. | 307/147 |
| 5,101,481 | 3/1992 | Anger et al. | 395/325 |
| 5,119,498 | 6/1992 | McNeill et al. | 395/800 |
| 5,150,465 | 9/1992 | Bush et al. | 395/275 |
| 5,165,022 | 11/1992 | Erhard et al. | 395/883 |
| 5,245,703 | 9/1993 | Hubert | 395/200 |
| 5,287,460 | 2/1994 | Olsen et al. | 395/883 |
| 5,289,580 | 2/1994 | Latif et al. | 395/275 |
| 5,321,819 | 6/1994 | Szczepanek | 395/325 |
| 5,457,784 | 10/1995 | Wells et al. | 395/829 |
| 5,457,785 | 10/1995 | Kikinis et al. | 395/308 |
| 5,528,765 | 6/1996 | Milligan | 395/287 |
| 5,544,326 | 8/1996 | Pease et al. | 395/872 |
| 5,548,782 | 8/1996 | Micheals et al. | 395/835 |
| 5,550,990 | 8/1996 | Keener et al. | 395/309 |
| 5,555,374 | 9/1996 | Armerding et al. | 395/835 |
| 5,577,213 | 11/1996 | Avery et al. | 395/280 |
| 5,615,344 | 3/1997 | Corder | 395/309 |
| 5,619,722 | 4/1997 | Lovrenich | 395/822 |
| 5,621,899 | 4/1997 | Gafford et al. | 395/299 |
| 5,628,027 | 5/1997 | Belmont | 395/821 |
| 5,640,541 | 6/1997 | Bartram et al. | 395/500 |
| 5,666,557 | 9/1997 | Cassidy et al. | 395/828 |
| 5,703,347 | 12/1997 | Reddersen et al. | 235/472 |

OTHER PUBLICATIONS

Black Box Catalog, "Serial Data Transmission", Pittsburgh, PA, p. 166, Sep. 1992.

ANSI, "Small Computer System Interface—2", New York, pp. 20–24, Jan. 1994.

*Primary Examiner*—Ayaz R. Sheikh
*Assistant Examiner*—Raymond N. Phan
*Attorney, Agent, or Firm*—Woodcock Washburn Kurtz Mackiewicz & Norris LLP

[57] ABSTRACT

A multiple interface input/output port allows communication between an interface bus of a peripheral device and any one of a plurality of different types of interface buses that may be provided in a host computer. An interface bus detection circuit detects which type of interface bus the peripheral device is connected to on the host computer, and communications are then routed through an appropriate interface adapter that enables communication between the interface buses of the peripheral device and host computer. The interface bus detection circuit compares signal levels on selected ones of the lines of the interface bus of the host computer to a reference potential to determine which of the selected lines are grounded. The circuit then identifies the type of interface bus to which it is connected based on the determination of which of the selected lines of the interface bus are grounded.

33 Claims, 8 Drawing Sheets

MULTIPLE INTERFACE INPUT/OUTPUT PORT FOR A PERIPHERAL DEVICE

BACKGROUND

1. Field of the Invention

The present invention relates generally to data communications between a host computer and a peripheral device, and more particularly, to a multiple interface input/output port that enables a peripheral device to be connected to any one of a plurality of different types of interface buses of a host computer.

2. Description of the Prior Art

A variety of so-called interface buses exist for enabling communication between a host computer and one or more peripheral devices, such as disk drives, printers, scanners, modems and the like. These interface buses include the Small Computer Systems Interface (SCSI) bus, which has several versions (i.e., SCSI-1, SCSI-2 and SCSI-3), and a number of parallel port buses, including the standard unidirectional parallel port found in early IBM PCs, the bidirectional parallel port found in IBM PS-2s, the extended capability port (ECP), the enhanced parallel port (EPP), and the IEEE-1284 standard parallel port. A host computer might have one or more of these interface buses, or "ports", to which peripheral devices can be connected. In other cases, the host computer may only have a single interface port for connecting peripheral devices. Communication of data over each of these different interface buses is usually performed in accordance with a communications protocol specific to the particular bus structure.

Unfortunately, the existence of such a variety of interface buses and associated communication protocols creates compatibility problems and generally makes the purchase of peripheral equipment more difficult and confusing for a typical consumer. For example, a consumer may purchase a new disk drive that is configured to communicate across a SCSI-2 interface, only to find that the computer to which the disk drive is to be attached only has a single, parallel port interface. In an attempt to provide a solution to this problem, a number of vendors provide parallel port-to-SCSI translators that can be connected between a SCSI peripheral and the parallel port of a personal computer for enabling communication of SCSI commands to the peripheral device via the host parallel port interface. While such an adapter provides a solution to the incompatibility problem, the consumer is faced with the cost of an additional component, as well as the time and effort needed to connect the adapter and install any necessary driver software.

Farago, U.S. Pat. No. 4,972,470, describes a "programmable connector" for a host computer that can be programmed to reconfigure its physical connections to match the serial interface characteristics, e.g., RS-232, RS-422 or RS-485, of a peripheral device to which it is connected. For example, the connector of Farago allows the user to reconfigure the I/O interface of the host computer so that it matches the I/O interface of a particular peripheral device that the user wishes to connect. While this may eliminate the need to purchase a different interface adapter for each new application, the programmable connector of Farago requires the user to identify the serial interface protocol, e.g., RS-232, RS-422 or RS-485, of the peripheral device, and then to download the appropriate programming instructions to the programmable connector in order to reconfigure the physical interface of the connector to match that of the peripheral interface. Unskilled users may find such programming difficult and confusing. Finally, because the connector of Farago simply reconfigures the necessary timing, pinouts, voltages and other physical parameters to match the physical interface characteristics of the device to which it is connected, it does not provide any sort of logical protocol translation necessary to enable communication between interfaces that operate in accordance with more sophisticated interface protocols, such as a SCSI protocol or the more advanced parallel port protocols.

Latif et al., U.S. Pat. No. 5,289,580, discloses an input/output controller that can be programmed to interact with a variety of interface protocols, such as IPI, SCSI and Message Level Interface (MLI). While the input/output controller provides the necessary logical protocol translation for enabling communication between two interface buses that communicate in accordance with different interface protocols, it too must be "programmed" to provide the appropriate protocol translation and does not automatically detect the type of interface bus to which it is connected. Consequently, the input/output controller of Latif et al. requires significant knowledge and input on the part of the user.

Accordingly, there is a need for a multiple interface input/output port adapted for use in a peripheral device that is capable of automatically detecting the type of interface bus to which it is connected in a host computer and then routing communications between the two devices through an appropriate interface adapter, if necessary, in a manner transparent to the user. Such apparatus would eliminate the need for cumbersome adapter devices and would provide a more user-friendly operation. The present invention satisfies this need.

SUMMARY OF THE INVENTION

The present invention is directed to a multiple interface input/output port for a peripheral device that is capable of automatically detecting the type of interface bus to which it is connected in a host computer and then routing communications between the two devices through an appropriate interface adapter, if necessary, in a manner transparent to the user. According to the present invention, the multiple interface input/output port comprises a connector, and an interface bus detection circuit electrically coupled to the connector. The interface bus detection circuit automatically detects the type (e.g., SCSI, parallel port, etc.) of the interface bus to which the connector is connected. The multiple interface input/output port further comprises a plurality of interface adapters, each connected between the connector and an internal interface bus of the peripheral device. Each of the interface adapters is capable of providing the necessary physical and logical translation between the interface bus of the peripheral device and a respective one of the plurality of different types of interfaces buses to which the peripheral device may be connected on a host computer. Once the type of the interface bus of the host computer has been detected by the interface bus detection circuit, an appropriate one of the interface adapters is enabled to provide the necessary translation between the detected interface bus of the host computer and the internal interface bus of the peripheral device. Communications between the host computer and the peripheral device are then routed through that interface adapter.

According to yet another aspect of the present invention, the multiple interface input/output port further comprises a pass-through bus for enabling communication between a third device and the host computer through the peripheral device.

In a preferred embodiment of the present invention, the peripheral device has a Small Computer Systems Interface (SCSI) bus for communicating with a host computer, and the multiple interface input/output port of the present invention allows the peripheral device to communicate with either a SCSI interface or a parallel port interface on the host computer. In accordance with this embodiment, the interface bus detection circuit detects whether the interface bus of the host computer is a SCSI bus or a parallel port interface bus. When a parallel port interface is detected, communications between the host computer and peripheral device are routed through a Parallel Port-to-SCSI (PP-SCSI) interface adapter that provides the necessary translation between the parallel port of the host computer and the SCSI bus of the peripheral device. When the interface bus detection circuit detects that the peripheral device is connected to a SCSI bus on the host computer, communications are routed through a repeater circuit that redrives signals transmitted between the SCSI bus of the peripheral device and the SCSI bus of the host computer.

According to another aspect of the present invention, the interface bus detection circuit comprises means for comparing signal levels on selected ones of the lines of an interface bus under consideration to a reference potential to determine which of the selected lines is grounded. The interface bus type is then indicated based on the determination of which of its lines are grounded. In a preferred embodiment of the interface bus detection circuit, the circuit is capable of detecting whether an interface bus is a SCSI bus or a peripheral bus. In this embodiment, the circuit comprises means for comparing voltage levels on each of lines 14, 16, 19 and 25 of an interface bus to a reference potential to determine which of these lines are grounded. A SCSI bus is detected when lines 14 and 16 are determined to be grounded; a parallel port interface is detected when either (i) line 25 of the interface bus under consideration is determined to be grounded or (ii) line 19 is determined to be grounded, and at least one of lines 14 and 16 are determined not to be grounded.

An alternative embodiment of the interface bus detection circuit detects whether line 25 of an interface bus under consideration is grounded. The circuit identifies the interface bus as a SCSI bus when line 25 is not grounded, and identifies the interface bus as a parallel port interface when line 25 is grounded.

Additional features and advantages of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings.

DETAILED DESCRIPTION OF THE PREFERRED EMBODIMENT

Figure 1:
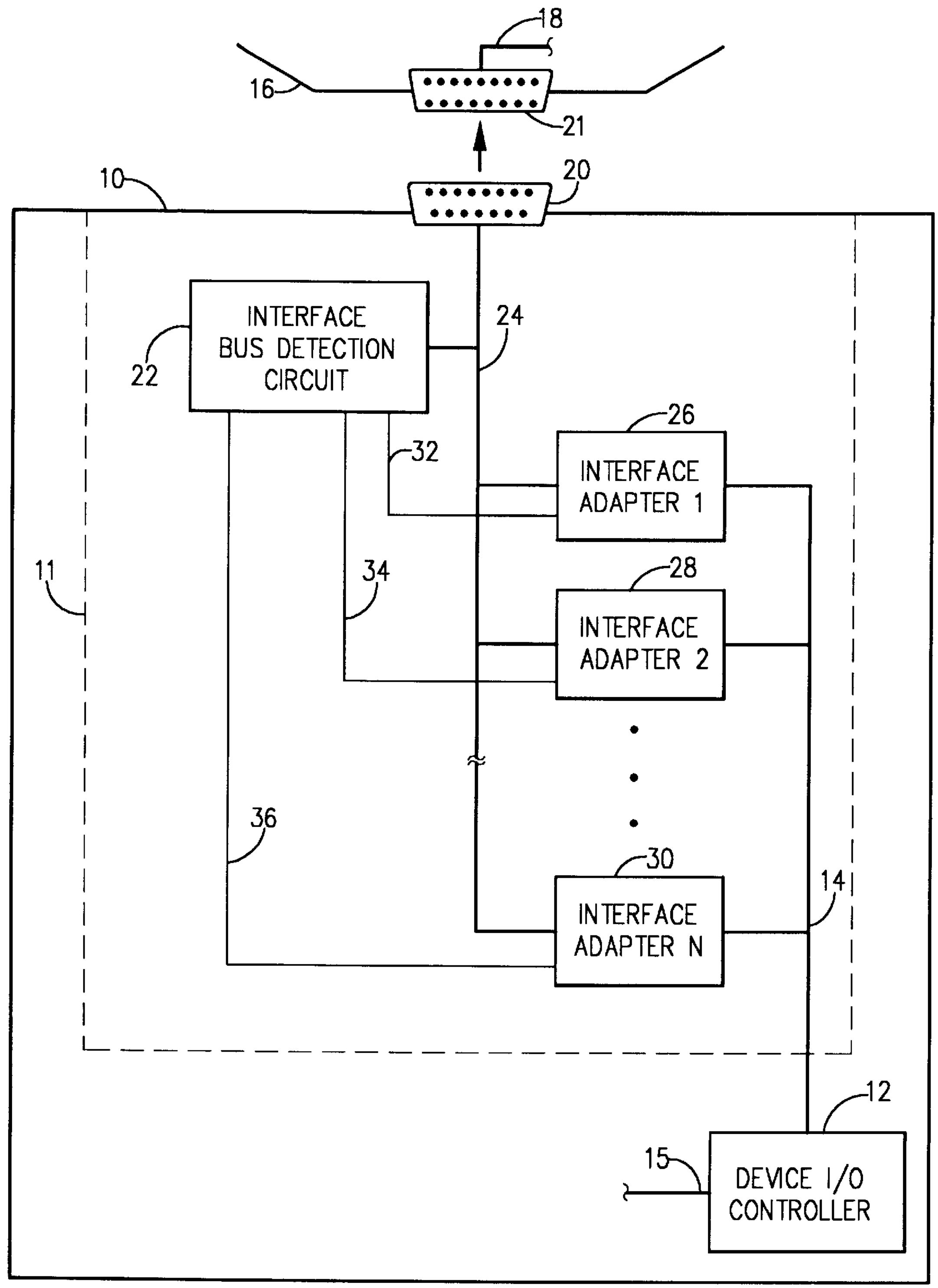
FIG. 1 is a block diagram of a multiple-interface input/output port according to the present invention.

Referring to the drawings wherein like numerals indicate like elements throughout, there is shown in FIG. 1 a multiple interface input/output port 11 in accordance with the present invention that enables communication between a peripheral device 10 having one type of interface bus 14 and a host computer 16 having any one of a plurality of different types of interface buses, e.g., interface bus 18. For example, the interface bus 14 of the peripheral device 10 may be a Small Computer Systems Interface (SCSI) bus, such as a SCSI-1, SCSI-2 or SCSI-3 bus. The interface bus 18 of the host computer 16 might be one of the different types of SCSI buses, or one of the various types of parallel port buses, e.g., ECP, EPP or IEEE-1284. The multiple interface input/output port 11 of the present invention automatically detects the type of host computer interface bus to which it is connected and then routes communications between the two devices through an appropriate interface adapter, if necessary, in a manner transparent to the user. Thus, communication between the peripheral device and host computer is enabled despite the fact that their respective interface buses are different. The multiple interface input/output port 11 of the present invention may be employed in a wide variety of different peripheral devices, such as disk drives, printers, CD-ROM drives and the like.

As shown in FIG. 1, the multiple interface input/output port 11 of the present invention comprises a connector 20 adapted to connect to a particular interface bus 18 of the host computer 16 via a mating connector 21 on the host computer 16. The connectors 20, 21 can be connected either directly, or via a suitable cable (not shown). An interface bus detection circuit 22 is electrically coupled to the connector 20 via an intermediate bus 24. Upon connection of the connector 20 to the interface bus 18 of the host computer, which effectively makes the intermediate bus 24 an extension of the interface bus 18 of the host computer 16, the interface bus detection circuit 22 operates to detect the type (e.g., SCSI, parallel port, etc.) of the interface bus 18 to which it is now connected. A plurality of interface adapters 26, 28, 30 are each electrically coupled between the connector 20 (i.e., intermediate bus 24) and the internal interface bus 14 of the peripheral device 10. Each interface adapter 26, 28, 30 provides the necessary physical and logical interface protocol translation between the interface bus 14 of the peripheral device 10 and a respective one of a plurality of different types of interface buses to which the peripheral device 10 may be connected on the host computer, e.g., computer 16. In the embodiment shown, each of the interface adapters 26, 28, 30 is coupled via a respective line 32, 34, 36 to the interface bus detection circuit 22 for receiving an enabling signal from the interface bus detection circuit.

In accordance with the present invention, the interface bus detection circuit 22 automatically detects the type of interface bus to which it is connected, and then enables an appropriate one of the plurality of interface adapters 26, 28, 30 based upon the detected type (e.g., SCSI, parallel port, etc.) of the interface bus to which it is connected, e.g., interface bus 18 of host computer 16. The enabled interface adapter then provides any necessary physical and logical protocol translation between the interface bus 14 of the peripheral device 10 and the detected type of interface bus to which it is connected. Thus, the I/O controller 12 of the peripheral device 10 can communicate over its interface bus 14 to the host computer 16 irrespective of the type of interface bus to which it is connected on the host computer 18.

For example, assuming that the interface bus 14 of the peripheral device 10 is a SCSI-2 bus, and that the interface bus 18 of the host computer 16 is a parallel port bus, one of the interface adapters 26, 28, 30 may comprise a parallel port-to-SCSI (PP-SCSI) interface adapter. With appropriate software drivers, the SCSI I/O controller 12 of the peripheral device 10 can transmit and receive SCSI commands over its internal interface bus 14 in accordance with the SCSI-2 protocol, while the PP-SCSI interface adapter provides the necessary physical and logical protocol translation to transmit and receive those commands to and from the parallel port interface 18 of the host computer 16. On the other hand, because the interface bus 14 of the peripheral device 10 and the interface bus 18 of the host computer 16 may in some cases be of the same type, in which case no protocol translation is really needed, one of the interface adapters 26, 28, 30 may comprise a repeater circuit that operates simply to redrive signals transmitted between the interface buses 14, 18 of the peripheral device 10 and host computer 16. The repeater circuit would be enabled whenever the interface bus 14 of the peripheral device 10 is of the same type as the detected interface bus 18 of the host computer 16. Although not illustrated in FIG. 1, the multiple interface input/output port 11 may further comprise means for routing data communicated between the interface buses 14, 18 of the peripheral device 10 and host computer 16 through the particular interface adapter (or repeater circuit) that has been enabled.

Most interface buses comprise a plurality of lines, some of which may be defined to carry data or control signals and others of which may carry a system ground. A particular type of interface bus is typically characterized by predetermined ones of the lines of the interface bus being grounded. Different lines are grounded on different types of interface buses. According to the present invention, as described hereinafter in accordance with a preferred embodiment thereof, the interface bus detection circuit 22 comprises means for comparing signal levels on selected ones of the lines of the host interface bus to a reference potential to determine which of the selected lines is grounded, and means for indicating the type of the host interface bus based on the determination of which of its lines are grounded.

OVERVIEW OF THE PREFERRED EMBODIMENT

Figure 2:
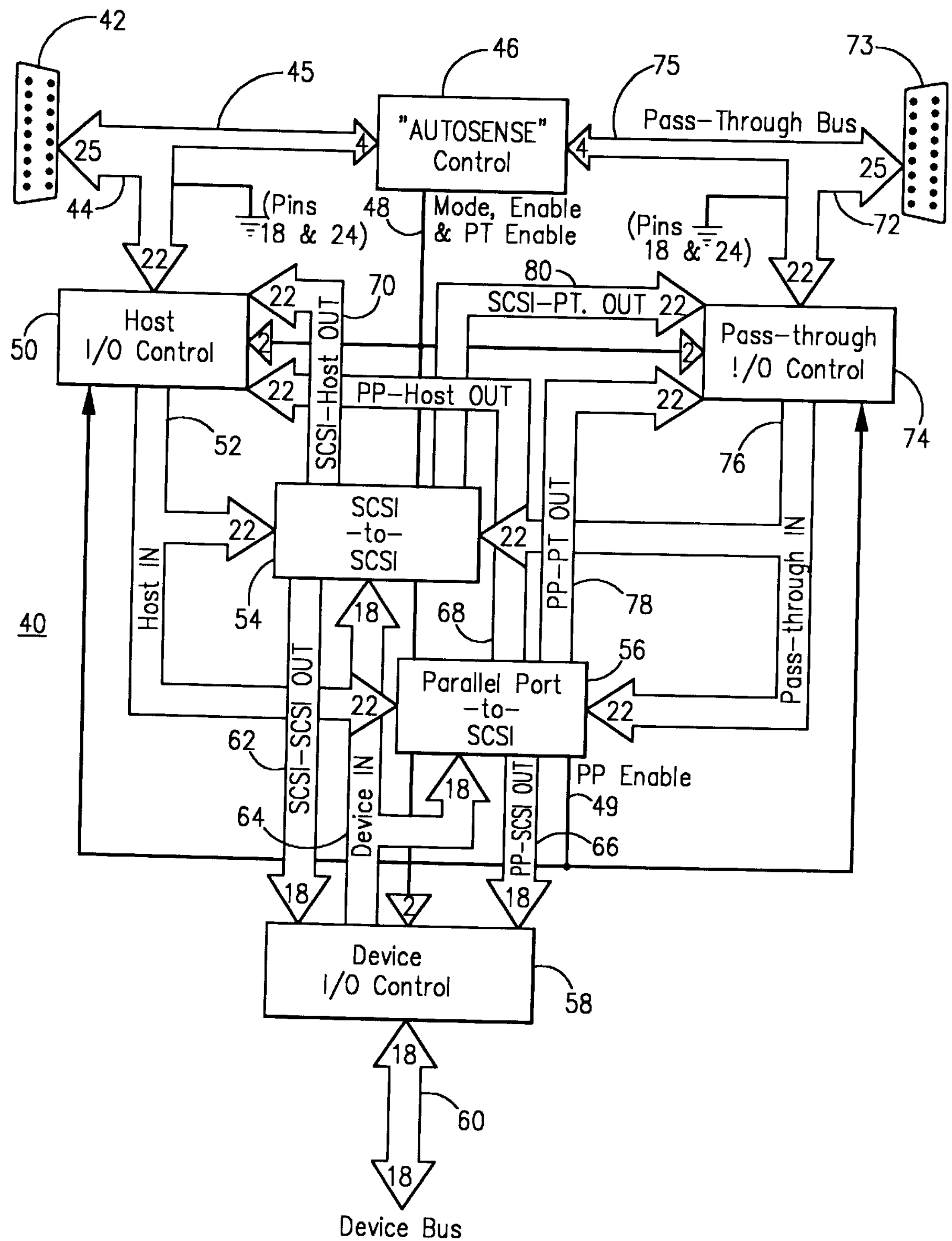
FIG. 2 is a block diagram of a preferred embodiment of a multiple-interface input/output port according to the present invention that enables a peripheral device to communicate with either a SCSI interface or a parallel port interface on a host computer.

FIG. 2 is a block diagram of a preferred embodiment of a multiple interface input/output port 40 in accordance with the present invention, which is embodied as part of a peripheral device (not shown) having an internal interface bus 60. According to the preferred embodiment, the multiple interface input/output port 40 of the present invention comprises a connector 42 (analogous to connector 20 of FIG. 1) that is adapted to connect to an interface bus or port (not shown) on a host computer (not shown). In the preferred embodiment, the connector 42 comprises a 25-pin DB connector, however, in other embodiments, the connector may comprise a 36-pin Centronics, 36-pin High Density, 50-pin Centronics or 50-pin High Density connector. When the connector 42 is connected to an interface bus of a host computer, an intermediate bus 44 of the multiple interface input/output port 40 (analogous to intermediate bus 24 of FIG. 1) serves as an extension of the host interface bus.

In the present embodiment, the internal interface bus 60 of the peripheral device is a SCSI-2 bus. As described hereinafter, the multiple interface input/output port 40 of the preferred embodiment is designed to enable communication between the SCSI-2 bus 60 of the peripheral device and either another SCSI-2 bus on the host computer, or a different type of bus such as, for example, the standard unidirectional or bi-directional parallel port bus, the extended parallel port bus (EPP) or the enhanced capability port (ECP).

An interface bus detection and control circuit 46 is coupled to selected lines 45 of the intermediate bus 44 for automatically detecting the type of interface bus to which it is connected on the host computer. Based on this determination, the interface bus detection and control circuit 46 provides "mode" and "enable" signals on lines 48 for purposes described hereinafter.

A SCSI-to-SCSI repeater circuit 54 and a parallel port-to-SCSI (PP-SCSI) interface adapter 56 are each coupled in parallel between the intermediate bus 44 and the interface bus 60 of the peripheral device via respective I/O control blocks 50 and 58. As described hereinafter in greater detail, the SCSI-to-SCSI repeater circuit 54 serves to redrive signals transmitted between the interface bus 60 of the peripheral device and the interface bus of the host computer when both interface buses are of the same type (i.e., SCSI-2). The PP-SCSI interface adapter 56 provides physical and logical protocol translation between the host interface bus and the interface bus 60 of the peripheral device when the host interface bus is of a different type than the SCSI-2 bus 60 of the peripheral device. With appropriate software drivers, the peripheral device can continue to transmit and receive SCSI commands over its interface bus 60 in accordance with the SCSI-2 protocol, while the PP-SCSI interface adapter 56 provides the necessary physical and logical protocol translation to transmit and receive those commands to and from the detected parallel port interface bus of the host computer via intermediate bus 44 and connector 42.

Once the interface bus detection circuit 46 of the present embodiment determines whether the connector 42 is connected to a SCSI bus or a parallel port bus on the host computer, the interface bus detection circuit 46 provides "mode" and "enable" signals on lines 48 in order to enable either the SCSI-SCSI repeater circuit 54 or the PP-SCSI interface adapter 56, as appropriate. In the present embodiment, a particular one of the two adapters 54, 56 is enabled by routing communications through that adapter via the Host and Device I/O control blocks 50 and 58. The Host and Device I/O control blocks 50, 58 are controlled by the "mode" and "enable" signals provided on lines 48 by the interface bus detection and control block 46. In the present embodiment, it is primarily the "mode" signal that determines whether communications are routed through the SCSI-to-SCSI repeater circuit 54 or the PP-SCSI interface adapter 56.

As can be appreciated, in the present embodiment, the SCSI-to-SCSI repeater circuit 54 and the PP-to-SCSI interface adapter 56 do not themselves receive "enabling" signals from the interface bus detection and control circuit 46. Rather, as described above, one of the two circuits 54, 56 is enabled by routing communications through that circuit via the Host and Device I/O control blocks 50 and 58. FIG. 1 illustrates an alternative possibility where the respective interface adapters (and/or repeater circuit) 26, 28, 30 receive respective enabling signals from the interface bus detection circuit 22 via lines 32, 34 and 36. As used herein and in the appended claims, the terms "enable" and "enabling" are intended to encompass all such possibilities.

In the present embodiment, the connector 42 comprises a 25 pin DSUB connector having 25 pins numbered consecutively, and the intermediate bus 44 likewise comprises 25 lines each coupled to a respective one of the pins of the connector 42. Table 1 illustrates how the 25 pins of the connector 42 and corresponding 25 lines of the intermediate bus 44 are defined, in accordance with the present invention, for both SCSI-2 and parallel port connections.

TABLE 1

SCSI and Parallel Port (PP) Definitions for Intermediate Bus 44

| LINE # | SCSI Function | PP Function |
|---|---|---|
| 1 | REO | nSTROBE |
| 2 | MSG | D1 |
| 3 | I/O | D2 |
| 4 | RST | D3 |
| 5 | ACK | D4 |
| 6 | BSY | D5 |
| 7 | GROUND | D6 |
| 8 | DB0 | D7 |
| 9 | GROUND | D8 |
| 10 | DB3 | nACK |
| 11 | DB5 | BUSY |
| 12 | DB6 | ERROR |
| 13 | DB7 | SELECT |
| 14 | GROUND | nAFEED |
| 15 | C/D | nFAULT |
| 16 | GROUND | nINIT |
| 17 | ATN | nSELECT IN |
| 18 | GROUND | GROUND |
| 19 | SEL | GROUND |
| 20 | DBP | GROUND |
| 21 | DB1 | GROUND |
| 22 | DB2 | GROUND |
| 23 | DB4 | GROUND |
| 24 | GROUND | GROUND |
| 25 | TERM PWR | GROUND |

Collectively, there are twenty-two lines (1–17 and 19–23) designated to carry data and/or control signals in accordance with either a SCSI or parallel port connection, and two lines defined as dedicated grounds (18 and 24). Line 25 carries termination power when the host interface bus is a SCSI bus, such as a SCSI-2 bus.

A data transmission cable can be employed to connect the 25-pin DB connector 42 of the multiple interface input/output port 40 to a corresponding connector of the interface bus (SCSI or parallel port) of the host computer. In the case where the mating connector on the host computer is also a 25-pin DB connector (either SCSI or parallel port), connection between the connector 42 and the particular interface port on the host computer is preferably made using an interchangeable SCSI/Parallel Port cable, such as that claimed and described in co-pending application Ser. No. 08/439,776, filed May 12, 1995, and entitled "Combined SCSI/Parallel Port Cable".

Referring still to FIG. 2, lines 1–17 and 19–23 (twenty-two lines total) of the intermediate bus 44 are provided to the Host I/O control block 50. The Host I/O Control block 50 provides these lines to the SCSI-to-SCSI repeater circuit 54 and to the PP-SCSI interface adapter 56, respectively, via an internal HostIN bus 52. (Note: the bus widths are indicated in FIG. 2 for each bus, e.g., "22", "18", "25".) Lines 18 and 24 of the intermediate bus 44 are grounded, and line 25 (not shown) is used to carry termination power from the host computer when the interface bus of the host computer to which the peripheral is connected is of the same type as the internal bus 60 of the peripheral, i.e., a SCSI-2 bus. Line 25 provides a ground when the host interface bus of the host computer is a parallel port bus.

The interface bus 60 of the peripheral device comprises eighteen signal lines that correspond to lines 1–6, 8, 10–13, 15, 17 and 19–23 of the intermediate bus 44. SCSI signals to be transmitted from the peripheral device to the host computer are provided by the Device I/O Control block 58 to the SCSI-SCSI repeater circuit 54 and the PP-SCSI interface adapter 56, via an internal DeviceIN bus 64.

As described hereinafter in greater detail, the SCSI-to-SCSI repeater circuit 54 redrives signals received on lines 1–6, 8, 10–13, 15, 17 and 19–23 of the HostIN bus 52 and provides these redriven signals to the Device I/O Control block via an internal SCSI-SCSI OUT bus 62. Lines 7, 9, 14 and 16 of the HostIN bus 52 are ignored in the SCSI-SCSI repeater circuit and are not provided to the input of the Device I/O Control block 58. Signals received by the SCSI-SCSI repeater circuit 54 from the Device I/O Control block 58 via the DeviceIN bus 64 are likewise redriven and provided to an input of the Host I/O Control block 50 via corresponding lines 1–6, 8, 10–13, 15, 17 and 19–23 of a twenty-two line internal SCSI-Host OUT bus 70. Lines 7, 9, 14 and 16 of the SCSI-Host OUT bus 70 are grounded.

The PP-to-SCSI interface adapter 56 receives signals transmitted from the host computer via the HostIN bus 52 and, when the interface bus of the host computer is a parallel port bus, provides both logical and physical translation of signals received on the HostIN bus 52 in a parallel port format into appropriate SCSI-2 signals that are then provided via an eighteen line internal PP-SCSI OUT bus 66 to an input of the Device I/O Control block 58. SCSI-2 signals received by the PP-SCSI interface adapter 56 from the Device I/O Control block 58 via the DeviceIN bus 64 are translated from their SCSI-2 format into appropriate parallel port signals which are then output to the Host I/O Control block 50 via a twenty-two line internal PP-HostOUT Bus 68. The twenty-two lines of the PP-HostOUT bus 68 correspond to lines 1–17 and 19–23 of the intermediate bus 44. For purposes of controlling the Host I/O Control block 50, the PP-SCSI interface adapter 56 provides a "PP enable" signal on line 49.

As mentioned above, the interface bus detection and control block 46 provides "mode" and "enable" signals depending on whether the host interface bus is determined to be a parallel port bus or a SCSI bus, such as a SCSI-2 bus.

When it is determined that the interface bus of the host computer to which the peripheral device is connected is a SCSI bus, the "mode" and "enable" signals cause the Device I/O Control block 58 to route signals on the SCSI-SCSI OUT bus 62 to the interface bus 60 of the peripheral device. The Device I/O Control block 58 disables the PP-SCSI OUT bus 66 in this case. Similarly, the "mode" and "enable" signals cause the Host I/O Control block 50 to receive signals from the repeater circuit 54 via the SCSI-HostOUT bus 70 and to route those signals to the intermediate bus 44 while disabling the PP-HostOUT bus 68. As a result, communications between the interface buses of the host computer and peripheral device are effectively routed through the SCSI-SCSI repeater circuit 54 via the respective I/O Control blocks 50, 58.

If, on the other hand, it is determined that the interface bus of the host computer to which the peripheral device is connected is a parallel port bus (i.e., a different type than the interface bus 60 of the peripheral device), the "mode" and "enable" signals cause the Device I/O Control block 58 to route signals transmitted on the PP-SCSI OUT bus 66 to the interface bus 60 of the device, while disabling the SCSI-SCSI OUT bus 62. The "mode" and "enable" signals cause the Host I/O Control block 50 to receive signals from the interface adapter 56 via the PP-HostOUT bus 68 and to route those signals to the intermediate bus 44 while disabling the SCSI-HostOUT bus 70. In this case, therefore, communications between the interface buses of the host computer and the peripheral device are effectively routed through the PP-SCSI interface adapter 56 via the respective I/O Control blocks 50, 58 in order to provide the necessary interface translation.

The Pass-through Bus

Still referring to FIG. 2, according to an additional feature of the present invention, the multiple interface input/output port 40 further comprises a pass-through bus 72 that allows a third device (not shown) to be connected to the host computer through the multiple interface input/output port 40. A second connector 73 is coupled to the pass-through bus 72 to facilitate connection of the third device to the pass-through bus 72. Selected lines 75 of the pass-through bus 72 are provided to the interface bus detection and control block 46 which, in addition to detecting the type of the interface bus of the host computer, also detects the type of the interface bus of the third device. In the present embodiment, the pass-through bus 72 is enabled only when the interface bus of the third device is of the same type as the interface bus of the host computer. A Pass-through I/O Control block 74 controls access to the pass-through bus 72 in response to the aforementioned "mode" signal from the interface bus detection and control block 46, as well as an additional "PT enable" signal described hereinafter.

Like the intermediate bus 44, lines 1–17 and 19–23 (twenty-two lines total) of the pass-through bus 72 are provided to the Pass-through I/O Control block 74. The Pass-through I/O Control block 50 routes these lines to the SCSI-to-SCSI repeater circuit 54 and to the PP-SCSI interface adapter 56 via an internal Pass-throughIN bus 76. Lines 18 and 24 of the pass-through bus 72 are grounded. Line 25 of the pass-through bus is controlled by the interface bus detection and control circuit 46, as described hereinafter.

When it is determined that the interface bus of the host computer and the interface bus of a third device connected to the pass-through bus 72 are both SCSI buses, e.g., SCSI-2 buses, SCSI signals received on the HostIN bus 52 from the host computer will be redriven by the SCSI-to-SCSI repeater circuit 54 and provided to the Pass-through I/O Control block 74 via an internal SCSI-PT OUT bus 80. The "mode" and "PT enable" signals from the interface bus detection and control block 46 cause the Pass-through I/O Control block 74 to route the signals on the SCSI-PT OUT bus 80 to the pass-through bus 72 for communication with the third device. Conversely, SCSI signals imposed on the Pass-throughIN bus 72 from the third device will be redriven on the SCSI-Host Out bus 70 for communication via the Host I/O Control block 50 to the host computer. As described hereinafter in greater detail, redriving of SCSI signals between the intermediate bus 44 and the pass-through bus 72 occurs in conjunction with the redriving of signals between the intermediate bus 44 and the interface bus 60 of the peripheral device. That is, the SCSI-SCSI repeater circuit 54 is a three-way redriving circuit that allows the first bus signal asserted on the HostIN, DeviceIN or Pass-throughIN buses 52, 64, 76 to control the output buses (SCSI-HostOUT 70, SCSI-SCSI OUT 62, SCSI-PT OUT 80) corresponding to the other two input buses. All of the devices therefore appear connected to a single, continuous SCSI bus.

When it is determined that the interface bus of the host computer and the interface bus of a third device connected to the pass-through bus 72 are both parallel port buses, parallel port signals received on the HostIN bus 52 from the host computer can be passed through the PP-SCSI interface adapter, without translation, to the Pass-through I/O Control block 74 via an internal PP-PT OUT bus 78. The Pass-through I/O Control block 74 will then route those signals to the pass-through bus 72; the SCSI-PT OUT bus 80 is disabled in this case. A command must be sent from the host computer to the PP-SCSI interface adapter 56 via the HostIN bus 52 in order to control the flow of parallel port data through the PP-SCSI adapter 56. When communication with the peripheral device is desired, the PP-SCSI interface adapter 56 is instructed to translate parallel port signals received on the Host IN bus 52 into appropriate SCSI-2 signals and to route those signals to the Device I/O Control block 58 via the PP-SCSI OUT bus 66. On the other hand, when communication with the third device attached to the pass-through bus 72 is desired, the PP-SCSI interface adapter 56 is instructed to simply allow any parallel port data received on the HostIN bus 52 to pass through the PP-SCSI interface adapter 56, without translation, to the PP-PT OUT bus 78.

I/O Control

Figure 3:
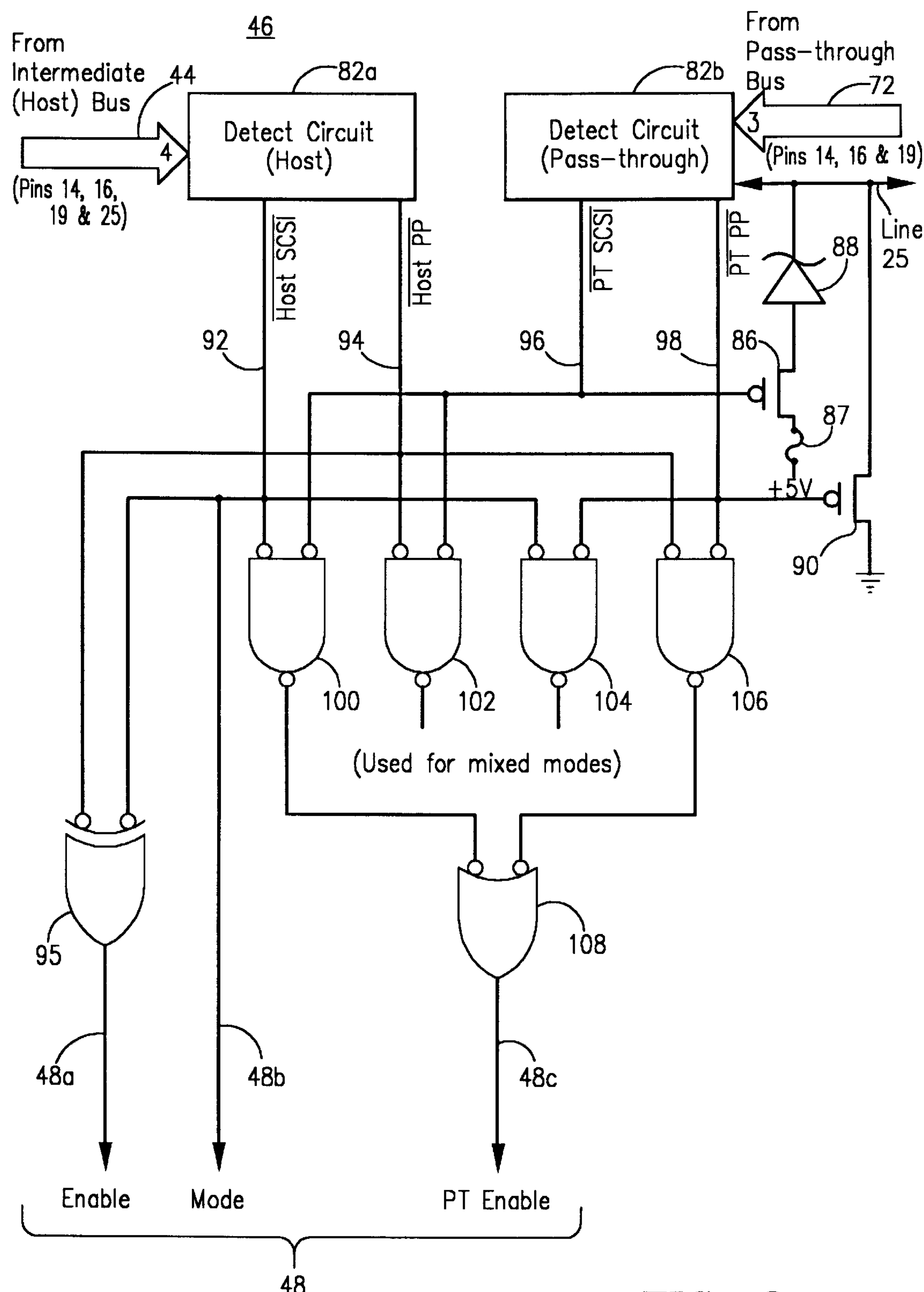
FIG. 3 is a block diagram illustrating further details of the interface bus detection and control block of FIG. 2.

Routing of communications between the host, device and pass-through buses via either the SCSI-SCSI repeater circuit 54 or the PP-SCSI interface adapter 56 is controlled by the interface bus detection and control block 46 and the respective I/O control blocks 50, 58 and 74. FIG. 3 is a block diagram illustrating further details of the interface bus detection and control block 46 in accordance with the preferred embodiment of the present invention. As shown, the interface bus detection and control block 46 comprises a first interface bus detection circuit **82*a* which receives, as inputs thereto, lines 14, 16, 19 and 25 of the intermediate bus 44. As described hereinafter, the first interface bus detection circuit 82*a* compares signal levels on those lines to a reference potential to determine whether the interface bus of the host computer is a SCSI bus or a parallel port bus. When a SCSI bus is detected, the first interface bus detection circuit 82*a* provides an active-low (i.e., logic-0) signal on line 92. Conversely, when a parallel port bus is detected, the first interface bus detection circuit 82*a* provides an active-low signal on line 94. When neither a parallel port bus nor a SCSI bus is detected, lines 92 and 94** remain high (i.e., logic-1).

An "enable" signal is provided on line 48*a* by an exclusive-OR gate 95 that receives the signals on lines 92 and 94 at inverted inputs thereof. As described hereinafter, the "enable" signal enables the output drivers of the Host and Device I/O Control blocks 50, 58 when a valid interface bus (i.e., SCSI or parallel port) is detected on the intermediate (host) bus 44. The enable signal is an active-high signal. If neither type of bus is detected, or if for some reason the interface bus detection circuit 82*a* provides a logic-0 signal on both lines 92 and 94, the exclusive-OR gate 95 ensures that the enable signal will not be asserted (i.e., line 48*a* will remain at logic-0). As further shown in FIG. 3, the active-low output on line 92 defines a "mode" signal that is provided to the respective I/O control blocks via line 48*b*. As described hereinafter, the "mode" signal controls the flow of data (either SCSI or parallel port) through the Host, Device and Pass-through I/O Control blocks 50, 58, 74. When the host interface bus is detected to be a SCSI bus, the "mode" signal on line 48*b* is low. Otherwise, the "mode" signal remains high.

A second interface bus detection circuit 82*b* receives, as inputs thereto, lines 14, 16, 19 and 25 of the pass-through bus 72. Assuming a third device is connected to the pass-through bus, the second interface bus detection circuit 82*b* compares signal levels on lines 14, 16, 19 and 25 to a reference potential to determine whether the interface bus of the third device is a SCSI bus or a parallel port bus. When a SCSI bus is detected, the second interface bus detection circuit 82*b* provides an active-low (i.e., logic-0) signal on line 96. Conversely, when a parallel port bus is detected, the second interface bus detection circuit 82*b* provides an active-low signal on line 98. When neither a parallel port bus nor a SCSI bus is detected, lines 96 and 98 remain high (i.e., logic-1).

An active-high "PT enable" signal is provided on line 48*c* to enable the output drivers of the Pass-through bus 72 whenever the interface buses of the host computer and third device are either both SCSI buses or both parallel port buses. Thus, in the preferred embodiment, the pass-through bus 72 is only enabled when the interface bus of the host computer is of the same type as the interface bus of the device attached to the pass-through bus 72. This simplifies the implementation of the pass-through bus 72 because no protocol translation is necessary. The "PT enable" signal is generated by logic gates 100, 106 and 108. Lines 92 and 96 are input to gate 100 (an OR function) which provides an active-low output (i.e., logic-0) whenever lines 92 and 96 are both at logic-0, indicating that the interface buses of the host computer and third device are both SCSI buses. Line 94 and 98 are input to gate 106 which provides an active-low output (i.e., logic-0) whenever lines 94 and 98 are both at logic-0, indicating that the interface buses of the host computer and third device are both parallel port buses. The outputs of gates 100 and 106 are fed to inverted inputs of gate 108. Thus, the "PT enable" line 48*c* is asserted (i.e., logic-1) whenever the interface buses of the host computer and third device are either both SCSI buses or both parallel port buses.

As illustrated in FIG. 3, two additional gates 102 and 104 are provided for future implementations in which the multiple-protocol input/output circuit 40 is adapted to handle cases in which the host interface bus and the interface bus of a third device connected to the pass-through bus are of different types. The output of gate 102 will be asserted (i.e., logic-0) when the interface bus of the host computer is a parallel port bus, but the pass-through device has a SCSI interface bus. Alternatively, the output of gate 104 will be asserted (i.e., logic-0) when the host interface bus is a SCSI bus, but the pass-through device has a parallel port bus. As can be appreciated, the multiple interface input/output port 40 can be configured to handle such mixed modes by adding an additional parallel port-to-SCSI interface adapter between the intermediate (host) and pass-through buses 44, 72 in order to provide the necessary protocol translation between the host computer and pass-through devices in such cases.

Finally, as further illustrated in FIG. 3, when the interface bus of a third device connected to the pass-through bus 72 is detected to be a SCSI, line 25 is coupled to a +5V power supply via diode 88 and transistor 86 in order to provide termination power to the pass-through device. A self-resetting fuse 87 is provided to protect the pass-through device, if necessary. Alternatively, when the interface bus of the third device is detected to be a parallel port interface bus, line 25 is grounded through transistor 90.

Figure 4:
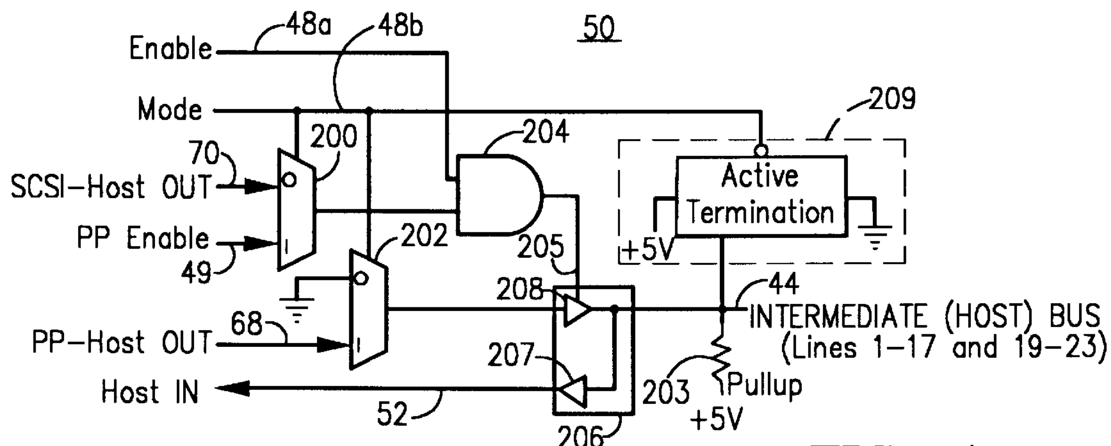
FIG. 4 is a schematic diagram illustrating further details of the Host I/O Control block of FIG. 2.

FIG. 4 is a block diagram showing further details of the Host I/O control block 50. In particular, FIG. 4 illustrates the two-way routing of signals between each of the twenty-two lines (1–17 and 19–23) of the intermediate (host) bus 44 and the respective lines, of the HostIN, PP-Host OUT and SCSI-Host OUT buses 52, 68, 70. As shown, signals transmitted from the Host computer are allowed to flow freely from each of lines 1–17 and 19–23 of the intermediate bus 44 to the HostIN bus 52 through the input 207 of a respective bi-directional line driver 206. Each line of the intermediate bus 44 is coupled to a +5V source through a pull-up resistor 203. The "enable" and "mode" signals are received on lines 48*a* and 48*b* from the interface bus detection and control block 46. These signals control first and second multiplexers 200,202 and an AND gate 204 for each line 1–17 and 19–23 of the intermediate bus 44.

When the interface bus of the host computer is detected to be a SCSI bus, e.g., a SCSI-2 bus, the "mode" signal is at logic-0 and the "0" input of each multiplexer 200, 202 is selected. Active high signals are provided by the SCSI-SCSI repeater circuit 54 on each line of the SCSI-Host OUT bus 70. When one of the lines of the SCSI-Host OUT bus 70 is asserted (i.e., logic-1), the output 208 of the respective bi-directional line driver 206 is enabled via line 205, and the corresponding line of the intermediate bus 44 is therefore pulled to ground through the "0" input of the respective multiplexer 202 on that line. Thus, the active high signals on the SCSI-Host OUT bus 70 are converted by the Host I/O control block 50 into active low SCSI signals on the intermediate bus 44.

When the interface bus of the host computer is detected to be a parallel port bus, the "mode" signal is at logic-1 and the other input of each multiplexer 200, 202 is selected. Also, in this mode, the PP-SCSI interface adapter 58 provides a "PP enable" signal (logic-1) on line 49. For each line of the intermediate bus 44, the "PP enable" signal is routed through the respective multiplexer 200 and gate 204 to enable the output 208 of the respective line driver 206 for that line. Each line of the intermediate bus 44 can then be driven by the PP-Host OUT bus 68 through the "1" input of its respective multiplexer 202.

Further in accordance with the preferred embodiment, as indicated at block 209 of FIG. 4, termination is provided on selected lines of the intermediate bus 44 in SCSI mode. In the present embodiment, SCSI termination is provided only on lines 1–6, 8, 10–13, 15, 17 and 19–23. When the interface bus of the host computer is detected to be a parallel port bus, termination is disabled by the "mode" signal.

Figure 5:
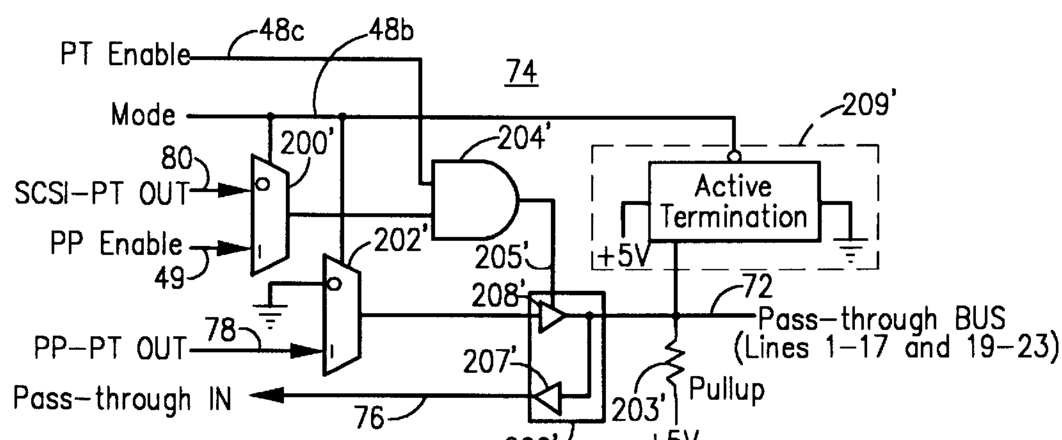
FIG. 5 is a schematic diagram illustrating further details of the Pass-through I/O Control block of FIG. 2.

FIG. 5 is a block diagram showing further details of the Pass-through I/O control block 74. In particular, FIG. 5 illustrates the two-way routing of signals between each of the twenty-two lines (1–17 and 19–23) of the pass-through bus 72 and the respective lines of the Pass-throughIN, PP-PT OUT and SCSI-PT OUT buses 76, 78, 80. As shown, signals transmitted from a third device connected to the pass-through bus are allowed to flow freely from each line (1–17 and 19–23) of the pass-through bus 72 to the Pass-through IN bus 76 through the input 207' of a respective bi-directional line driver 206'. Each line of the pass-through bus 72 is coupled to a +5V source through a pull-up resistor 203'. The Pass-through I/O Control block 74 receives the "PT enable" signal on line 48*c* from the interface bus detection and control circuit 46, rather than the "enable" signal that the Host and Device I/O Control blocks 50, 58 receive. The "mode" signal is received on line 48*b*. These signals control first and second multiplexers 200', 202' and an AND gate 204' for each line (1–17 and 19–23) of the pass-through bus 72. As can be appreciated, the Pass-through I/O Control block 74 functions similarly to the Host I/O Control block 50.

When the interface bus of the third device connected to the pass-through bus 72 is detected to be a SCSI bus, the "mode" signal is at logic-0 and the "0" input of each multiplexer 200', 202' is selected. Active high signals are provided by the SCSI-SCSI repeater circuit 54 on each line of the SCSI-PT OUT bus 80. When one of the lines of the SCSI-PT OUT bus 80 is asserted (i.e., logic-1), the output 208' of the respective bi-directional line driver 206' is enabled via line 205', and the corresponding line of the pass-through bus 72 is pulled to ground through the "0" input of the respective multiplexer 202' on that line. Thus, the active-high signals on the SCSI-PT OUT bus 80 are converted by the Pass-through I/O Control block 74 into active-low SCSI signals on the pass-through bus 72.

When the interface bus of the pass-through device is detected to be a parallel port bus, the "mode" signal is at logic-1 and the other input of each multiplexer 200', 202' is selected. Also, as mentioned above, the PP-SCSI interface adapter 58 provides a "PP enable" signal (logic-1) on line 49 in this mode. For each line of the pass-through bus 72, the "PP enable" signal is routed through the respective multiplexer 200' and gate 204' to enable the output 208' of the respective line driver 206' for that line. Each line (1–17 and 19–23) of the pass-through bus 72 can then be driven by the PP-PT OUT bus 78 through the "1" input of its respective multiplexer 202'. Like the intermediate bus 44, as indicated at block 209', termination is provided on selected lines of the pass-through bus 72 in SCSI mode. In the present embodiment, SCSI termination is provided only on lines 1–6, 8, 10–13, 15, 17 and 19–23 of the pass-through bus 72. When the interface bus of the pass-through device is detected to be a parallel port bus, termination is disabled by the "mode" signal.

Figure 6:
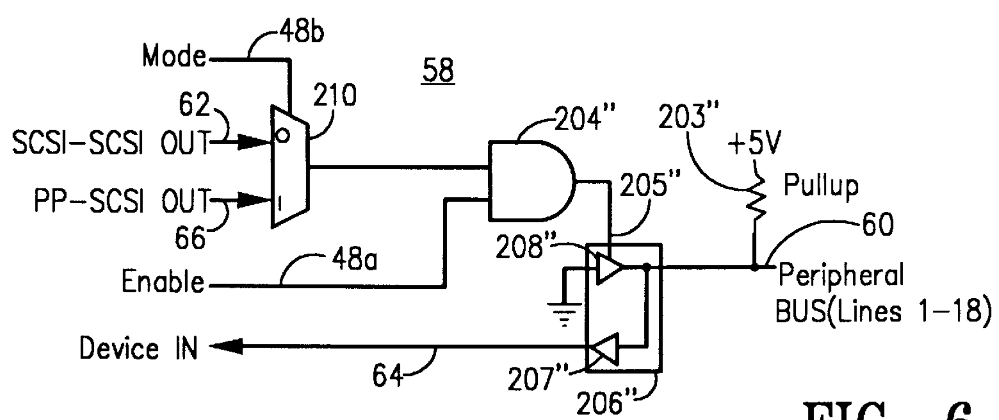
FIG. 6 is a schematic diagram illustrating further details of the Device I/O Control block of FIG. 2.

FIG. 6 is a block diagram showing further details of the Device I/O Control block 58. In particular, FIG. 6 illustrates the two-way routing of signals between each of the eighteen lines of the interface bus 60 of the peripheral device and the respective lines of the DeviceIN, SCSI-SCSI OUT and PP-SCSI OUT buses 64, 62, 66, respectively. As shown, signals asserted by the peripheral device on its interface bus 60 are allowed to flow freely from each line of the interface bus 60 to the DeviceIN bus 64 through the input 207" of a respective bi-directional line driver 206". The other input 208" of each bi-directional line driver 206" is coupled to ground. Each line of the peripheral interface bus 60 is coupled to a +5V source through a pull-up resistor 203". The Device I/O Control block 58 receives the "enable" and "mode" signals on lines 48*a* and 48*b*, respectively, from the interface bus detection and control block 46. These signals control a multiplexer 210 and an AND gate 204" for each line (1–18) of the peripheral interface bus 60.

When the interface bus of the host computer is detected to be a SCSI bus, the "mode" signal is at logic-0 and the "0" input of the multiplexer 210 on each line of the interface bus 60 is selected. The SCSI-SCSI repeater circuit 54 provides active high signals on each line of the SCSI-SCSI OUT bus 62. When one of the lines of the SCSI-SCSI OUT bus 62 is asserted (i.e., logic-1), the output 208" of the respective bi-directional line driver 206" is enabled via line 205", and the corresponding line of the peripheral interface bus 60 is therefore pulled to ground via the grounded input 208" of the line driver 206". Thus, the active high signals on the SCSI-SCSI OUT bus 62 are converted by the Device I/O Control block 58 into active low SCSI signals on the interface bus 60 of the peripheral device.

When the interface bus of the host computer is detected to be a parallel port bus, the "mode" signal is at logic-1 and the other input of each multiplexer 210 is selected. The PP-SCSI interface adapter 56 provides active high signals on each line of the PP-SCSI OUT bus 66. When one of the lines of the PP-SCSI OUT bus 66 is asserted (i.e., logic-1), the output 208" of the respective bi-directional line driver 206" is enabled via line 205", and the corresponding line of the peripheral interface bus 60 is therefore pulled to ground via the grounded input 208" of the line driver 206". Thus, the active high signals on the PP-SCSI OUT bus 66 are also converted by the Device I/O Control block 58 into active low signals on the interface bus 60 of the peripheral device. No termination is provided on the interface bus 60 of the peripheral device.

As the foregoing illustrates, the Host, Device and Pass-through I/O Control blocks 50, 58, 74 respond to the "mode", "enable" and "PT enable" signals in order to route communications between the host computer, the peripheral device and a third device through either the SCSI-SCSI repeater circuit 54 or the PP-SCSI interface adapter 56 depending on the detected interfaces of the host and pass-through devices.

Interface Bus Detection

As mentioned above, most interface buses comprise a plurality of lines, some of which may be defined to carry data and control signals, and others of which may carry a system ground. A particular type of interface bus (e.g., SCSI, parallel port, etc.) is typically characterized by predetermined ones of the lines of the interface bus being grounded. Typically, different lines are grounded on different types of interface buses. For example, lines 14 and 16 of a SCSI bus are grounded, whereas a parallel port bus has either line 25 grounded, or line 19 grounded and at least one of lines 14 and 16 not grounded.

Figure 7:
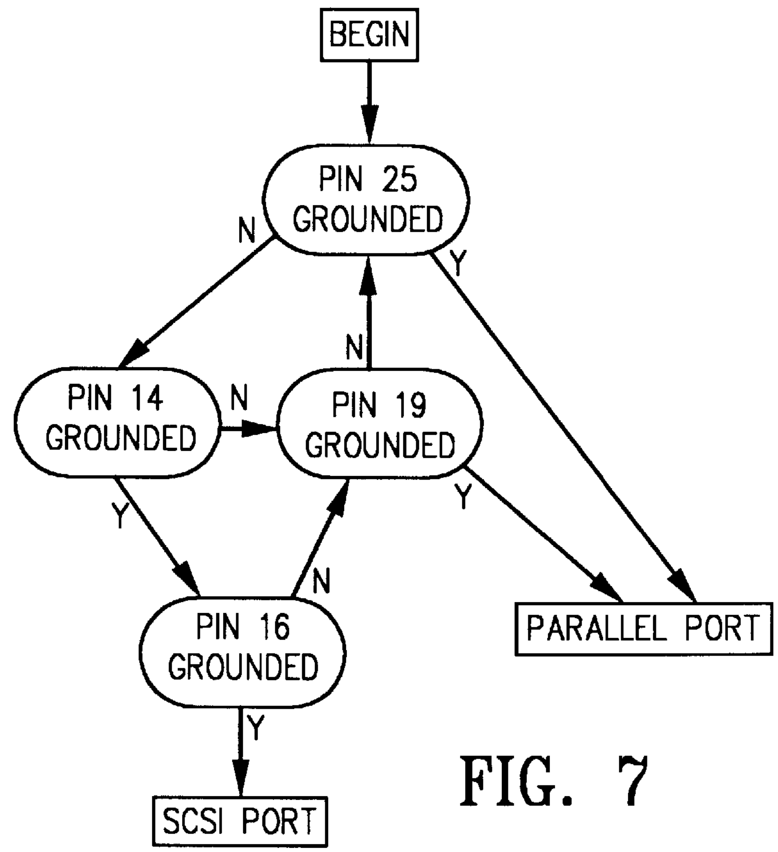
FIG. 7 is a state diagram illustrating a method for determining whether an interface bus is a SCSI bus or a parallel port interface bus in accordance with a preferred embodiment of the present invention.

According to another aspect of the present invention, a method of detecting a particular type of interface bus from a plurality of different known types of interface buses comprises the steps of comparing signal levels on selected ones of the lines of an interface bus under consideration to a reference potential to determine which of the selected lines of the interface are grounded, and then indicating the type (e.g., SCSI, parallel port, etc.) of the interface bus based on the determination of which lines are grounded. FIG. 7 is a state diagram illustrating a preferred embodiment of the method of the present invention. The method illustrated in FIG. 4 is capable of detecting whether an interface bus is either a SCSI bus or a parallel port bus.

In the present embodiment, the interface bus under consideration (e.g., intermediate (host) bus 44 or pass-through bus 72) is assumed to comprise twenty-five lines numbered consecutively, each line being defined as indicated in Table 1 depending on whether the interface bus is a SCSI bus or a parallel port bus. As shown in FIG. 4, the method comprises the steps of comparing voltage levels on each of lines 14, 16, 19 and 25, and then indicating the type of the interface bus based on the determination of which lines are grounded. Specifically, an indication that the interface bus under consideration is a parallel port protocol is made when either (i) line (i.e., connector pin) 25 is grounded or (ii) line 19 is grounded and at least one of lines 14 and 16 is not grounded. An indication that the interface bus is a SCSI bus, e.g., SCSI-1, SCSI-2 or SCSI-3, is made when line 25 is determined not to be grounded, but lines 14 and 16 are determined to be grounded. A state in which lines 25 and 19 are not grounded and at least one of lines 14 and 16 is not grounded is undefined. It is understood that the method of the present invention is not limited to detecting parallel port and SCSI buses, but may be employed to distinguish between any number of different interface buses so long as each interface bus is characterized by a unique pattern of grounded lines. Moreover, the preferred embodiment is not limited to use in connection with SCSI and/or parallel port interface buses of twenty five lines. Rather, the method may be employed to detect a SCSI or parallel port bus on any one of the standard bus sizes typically employed in accordance with these interfaces. Also, other lines of the SCSI and parallel port bus structures may be examined to determine whether a particular interface bus is a SCSI bus or a parallel port interface bus, and the present invention is by no means limited to use of lines 14, 16, 19 and 25 in this regard.

An alternate method of detecting whether an interface bus is a SCSI bus or a parallel port bus comprises the steps of comparing a voltage level on line 25 to a reference potential to determine only whether line 25 is grounded. An indication that the interface bus is a SCSI bus is made if line 25 is determined not to be grounded. An indication that the interface bus is a parallel port bus is made if line 25 is determined to be grounded.

An interface bus detection circuit in accordance with the present invention, which may be used to implement interface bus detection circuits 82*a* and 82*b* of FIG. 3, comprises means for comparing signal levels on selected ones of the lines of an interface bus to a reference potential to determine which of the selected lines is grounded, and means for indicating the type of the interface bus based on the determination of which lines are grounded.

Figure 8:
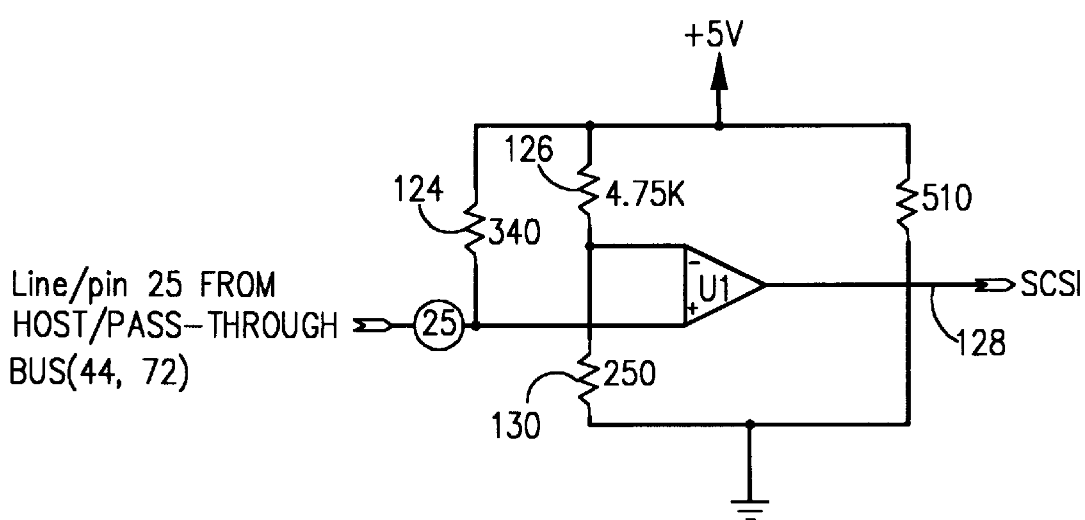
FIG. 8 is a schematic diagram of one embodiment of an interface bus detection circuit for determining whether an interface bus is a SCSI bus or a parallel port interface bus.

FIG. 8 is a schematic diagram of one embodiment of an interface bus detection circuit in accordance with the present invention. The interface bus detection circuit of FIG. 8 implements the alternate method described above. As shown, the circuit comprises a single open-collector voltage comparator U1. The non-inverting input ("+") of the comparator U1 is connected directly to line 25 of the interface bus. Line 25 is coupled to a +5V source through pull-up resistor 124 to ensure that signal integrity to the remainder of the multiple interface input/output port 40 is not lost. The inverting input ("−") of the comparator U1 is biased with a reference voltage. The reference voltage is determined by a pair of resistors 126, 130 that form a voltage divider. In the preferred embodiment, resistor 126 comprises a 4.75 kΩ resistor, and resistor 130 comprises a 250Ω resistor. Consequently, the reference voltage appearing at the inverting input ("−") of the comparator U1 is slightly above 0 volts. When line 25 is grounded, the output 128 of the comparator is low indicating that the interface bus is not a SCSI bus; it is assumed in this case that the interface bus is therefore a parallel port bus. If line 25 is not grounded, which is the case with a SCSI bus, e.g., SCSI-2, the voltage level at the non-inverting input ("+") of the comparator U1 will exceed the reference voltage at the inverting input ("−"). Consequently, the output 128 of the comparator U1 will be high indicating that a SCSI bus has been detected.

Figure 9:
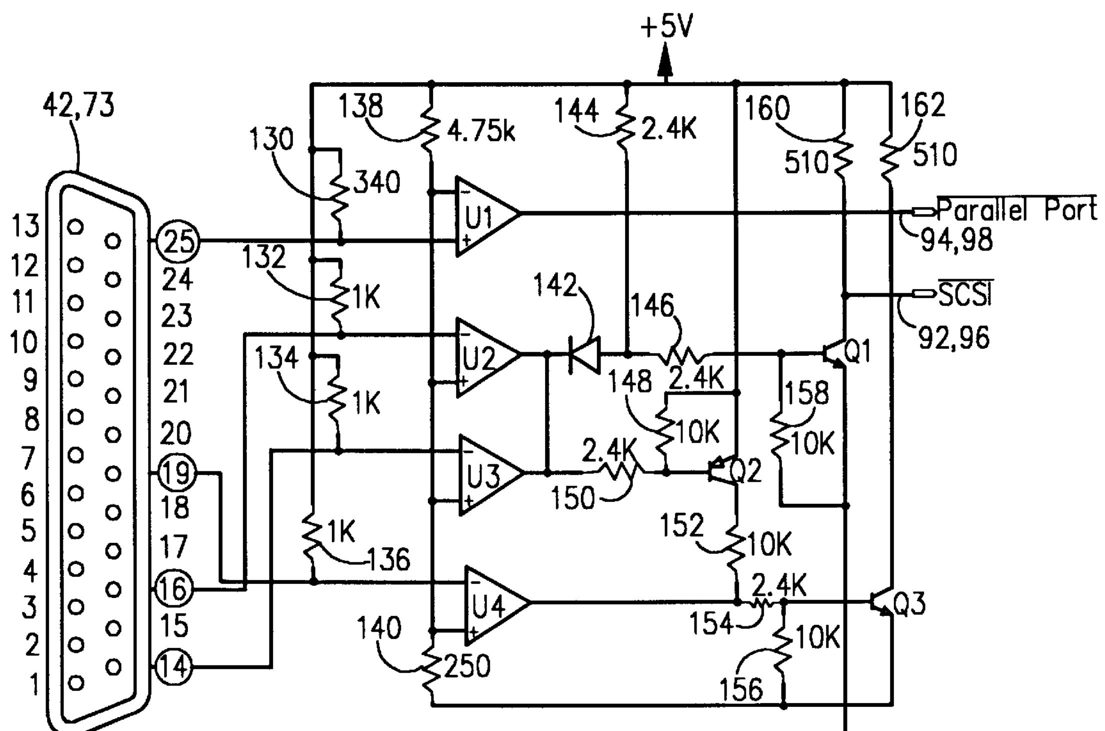
FIG. 9 is a schematic diagram of a second embodiment of an interface bus detection circuit according to the present invention.

FIG. 9 is a schematic diagram illustrating both a circuit for carrying out the method of FIG. 7 and another embodiment of an interface bus detection circuit in accordance with the present invention. According to this embodiment, the means for comparing signal levels on selected ones of the lines of an interface bus under consideration to a reference potential comprises four open collector voltage comparators U1, U2, U3 and U4, coupled respectively to lines 25, 16, 14 and 19. Each comparator U1, U2, U3, U4 compares its respective line of the interface bus to a reference potential determined by resistors 138 and 140 which form a voltage divider. The reference voltage, which in the present embodiment is slightly above 0 volts, is applied to the inverting input "−" of comparator U1, and the non-inverting inputs "+" of comparators U2, U3 and U4. The other input of each comparator U1, U2, U3, U4 is tied directly to its respective line of the interface bus. When line 25 is grounded, the output of comparator U1 will be low (i.e., ≈0 volts). When lines 14, 16 or 19 are grounded, the output of their respective comparators U3, U2, U4 will be high (i.e., ≈5 volts).

The interface bus detection circuit of the present invention is intended to perform a monitoring function only; the circuit should not interfere with the signal on any of the lines of the interface bus. Accordingly, in the present embodiment, lines 14, 16, 19 and 25 of the interface bus are coupled to a +5V source through respective pull-up resistors 134, 132, 136 and 130. The pull-up resistors 130–136 ensure that signal integrity on each line is not lost.

Transistors Q1, Q2, Q3 and respective biasing resistors 144–162 comprise a means for indicating whether the interface bus is a SCSI type or a parallel port type based on the outputs of the respective comparators U1, U2, U3 and U4. A SCSI bus is indicated when transistor Q1 is turned on (i.e., line 92 or 96 goes low), and a parallel port bus is indicated when either Q3 is turned on or the output of comparator U1 is low (i.e., line 94 or 98 goes low). Transistor Q1 turns on when the outputs of comparators U2 and U3 are both high (i.e., lines 14 and 16 are grounded). Transistor Q3 turns on when the output of comparator U4 goes high (i.e., line 19 is grounded) and either comparator U2 or comparator U3 is low (i.e., either of lines 14 and 16 is not grounded). As the foregoing illustrates, therefore, the interface bus detection circuit of FIG. 9 indicates that the interface bus is a SCSI bus when lines 14 and 16 are both grounded, and indicates that the interface bus is a parallel port bus when either (i) line 25 is grounded, or (ii) line 19 is grounded but at least one of lines 14 and 16 is not grounded.

FIG. 9 is a schematic diagram illustrating an alternative circuit for carrying out the method of FIG. 7, as well as yet another embodiment of an interface bus detection circuit in accordance with the present invention.

In this third embodiment, like the previous embodiment, the means for comparing signal levels on selected ones of the lines of the interface bus under consideration to a reference potential comprises four open collector voltage comparators U1, U2, U3 and U4, coupled respectively to lines 25, 16, 14 and 19. Each comparator U1, U2, U3, U4 compares its respective line of the interface bus to a reference potential determined by resistors 172 and 174 which form a voltage divider. In the present embodiment, the reference voltage, which again approaches 0 volts, is applied to the non-inverting input "+" of each comparator U1, U2, U3 and U4. The other input "−" of each comparator U1, U2, U3, U4 is tied directly to its respective line of the interface bus. The outputs of each comparator U1, U2, U3, U4 are coupled to the +5V source through respective pull-up resistors 176–182. When any one of lines 14, 16, 19 and 25 is grounded, the output of its respective comparator U3, U2, U4, U1 goes high (i.e., logic-1). Otherwise, the outputs of each comparator are low (i.e., logic-0).

The interface bus detection circuit of the present invention performs a monitoring function only, and the circuit should not interfere with the signal on any of the lines of the interface bus. Accordingly, in the present embodiment, lines 14, 16, 19 and 25 of the interface bus are coupled to a +5V source through respective pull-up resistors 168, 166, 170 and 164. The pull-up resistors 164–170 ensure that signal integrity on each line is not lost.

Logic gates U5-U12 comprise a means for indicating whether the interface bus is a SCSI bus or a parallel port bus based on the outputs of the respective comparators U1, U2, U3 and U4. A SCSI bus is indicated when NAND gate U11 receives a logic-1 at both inputs. A parallel port bus is indicated when NAND gate U12 receives a logic-1 at both inputs. Exclusive-OR gate U10 prevents both inputs of U11 and U12 from going high at the same time. The outputs of logic gates U6 and U9 drive the inputs of gates U11 and U12, respectively. Thus, AND gate U11 will receives a logic-1 at both inputs when the output of AND gate U6 is high; AND gate U12 will receive a logic-1 at both inputs when the output of OR gate U9 is high.

AND gate U6 outputs a logic-1 when the outputs of comparators U2 and U3 are high, and the output of comparator U1 is low (i.e., lines 14 and 16 are grounded, but line 25 is not grounded). OR gate U9 outputs a logic 1 when either (i) the output of comparator U1 is high (i.e., line 25 is grounded) or (ii) the output of comparator U4 is high, and at least one of the outputs of comparators U2 and U3 is low (i.e., line 19 is grounded, and at least one of lines 14 and 16 is not grounded). As the foregoing illustrates, therefore, the interface bus detection circuit of FIG. 9 indicates that the interface bus is a SCSI bus when lines 14 and 16 are both grounded, and indicates that the interface bus is a parallel port bus when either (i) line 25 is grounded, or (ii) line 19 is grounded but at least one of lines 14 and 16 is not grounded.

Figure 10:
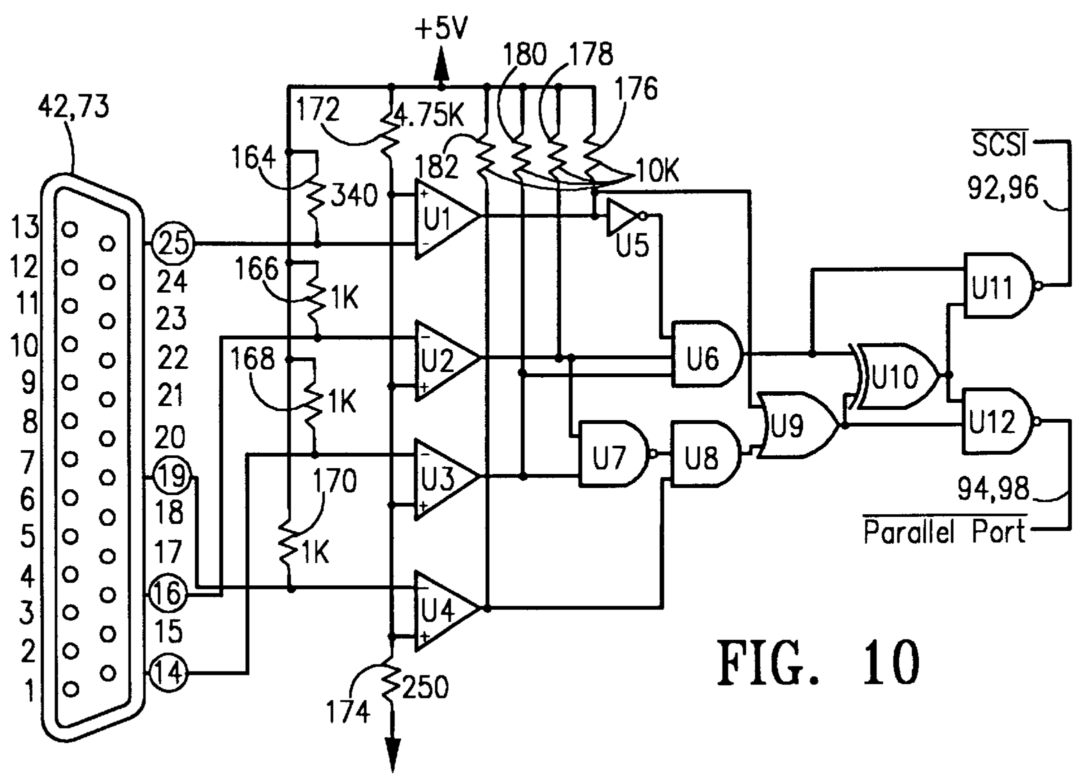
FIG. 10 is a schematic diagram of a third embodiment of an interface bus detection circuit according to the present invention.

Preferably, the first and second interface bus detection circuits 82*a* and 82*b* of the interface bus detection and control block 46 illustrated in FIG. 3 are each implemented using one of the interface bus detection circuits illustrated in FIGS. 9 and 10. As can be appreciated, the interface bus detection circuit of FIG. 9 provides an analog solution, whereas the interface bus detection circuit of FIG. 10 provides a digital solution. While the circuits of FIGS. 9 and 10 are preferred, either one of the interface bus detection circuits 82*a*, 82*b* could be implemented using the interface bus detection circuit of FIG. 8.

It is understood that the interface bus detection circuits of FIGS. 8–10 are not limited to the detection of parallel port and SCSI buses, but may be employed to distinguish between any number of different types of interface bus so long as each different type of interface bus is characterized by a unique pattern of grounded lines.

Moreover, the preferred embodiment is not limited to use in connection with SCSI and/or parallel port interface buses of twenty five lines, or pins. Rather, the method may be employed in connection with any one of the standard bus sizes typically employed in accordance with these interface protocols.

Parallel Port-to-SCSI Interface adapter

Figure 11A:
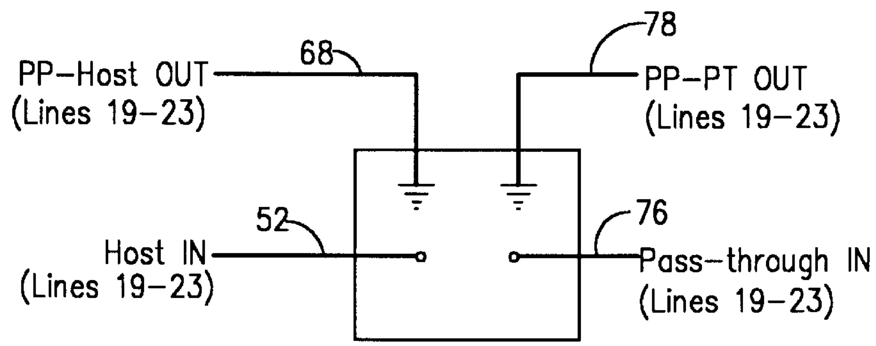
FIGS. 11(*a*) and 11(*b*) illustrate further details of the parallel port-to-SCSI (PP-SCSI) interface adapter of FIG. 2.
Figure 11B:
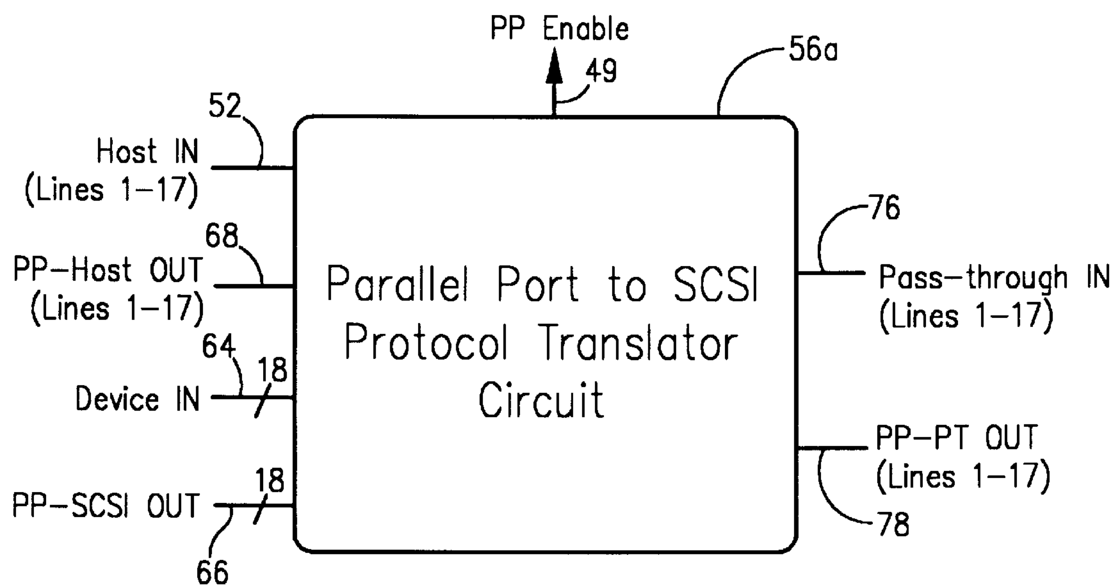

FIGS. 11(*a*) and 11(*b*) illustrate further details of the PP-SCSI interface adapter 56 of FIG. 2 in accordance with the preferred embodiment of the present invention. As illustrated in FIG. 11(*a*), lines 19–23 of the PP-Host OUT and PP-PT OUT buses 68 and 78 are tied low. As described above, these grounded lines of the PP-Host OUT and PP-PT OUT buses 68, 78 feed the respective output drivers of the Host and Pass-through I/O Control blocks 50 and 74, respectively. As further shown in FIG. 11(*a*), lines 19–23 of the HostIN and Pass-throughIN buses 52, 76 are open-circuited in the PP-SCSI interface adapter 56 since they are defined as grounds in accordance with the parallel port protocols and therefore do not carry any information that requires translation.

Lines 1–17 of the HostIN and Pass-throughIN buses 52, 76 are provided as inputs to a parallel port-to-SCSI adapter circuit 56*a*. Lines 1–17 of the PP-Host OUT and PP-PT OUT buses are connected to respective outputs of the adapter circuit 56*a*. The eighteen lines of the DeviceIN and PP-SCSI OUT buses 64, 66, which correspond to lines 1–6, 8, 10–13, 15, 17 and 19–23 of the intermediate and pass-through buses 44, 72, are also connected to respective inputs and outputs of the adapter circuit 56*a*.

When the multiple interface input/output port of the present invention is in parallel port mode (i.e., the host interface is detected to be a parallel port bus), a command can be issued from the host computer to the PP-to-SCSI adapter circuit 56*a*, via the HostIN bus 52, instructing the adapter circuit 56*a* either to provide the necessary physical and logical protocol translation to enable communication between the host interface bus and the peripheral interface bus 60, or (ii) to pass parallel port data from the host computer through the PP-SCSI interface adapter 56, without translation, to the pass-through bus 72 when communication with a third device connected to the pass-through bus 72 is desired.

When the adapter circuit 56*a* is instructed by the host computer to enable communication with the interface bus 60 of the peripheral device, parallel port signals received from the host computer on the HostIN bus 52 are translated (logically and physically) into appropriate SCSI signals that are then provided to the Device I/O Control block 58 via the eighteen line PP-SCSI OUT bus 66. SCSI signals received by the PP-SCSI interface adapter from the Device I/O Control block 58 via the DeviceIN bus 64 are translated from their SCSI format into appropriate parallel port signals which are then output to the Host I/O Control block 50 via the twenty-two line internal PP-HostOUT Bus 68. The twenty-two lines of the PP-HostOUT bus 68 correspond to lines 1–17 and 19–23 of the intermediate bus 44. For purposes of controlling the Host I/O Control block 50, the PP-SCSI adapter circuit 56*a* provides a "PP enable" signal on output line 49.

In a case where the interface buses of both the host computer and a third device connected to the pass-through bus 72 are both parallel port buses, and where the adapter circuit 56*a* has been instructed by the host computer to enable communication with the third device, parallel port signals received on the HostIN bus 52 from the host computer are passed through the adapter circuit 56*a*, without translation, to the Pass-through I/O Control block 74 via the internal PP-PT OUT bus 78. The Pass-through I/O Control block 74 then routes the signals to the pass-through bus 72 for communication with the third device. Parallel port data to be transmitted from the third device to the host computer is passed through the adapter circuit 56*a* from the PassthroughIN bus 76 to the PP-HostOUT bus 68, likewise without translation.

The PP-SCSI protocol adapter circuit 56*a* may be implemented using any one of a variety of commercially available parallel port-to-SCSI adapter solutions. For example, the PP-SCSI adapter circuit 56*a* may be implemented using the discrete components employed in the Iomega PPA-3 parallel port-to-SCSI adapter available from Iomega Corporation, 1821 West 4000 South, Roy, Utah 84067, assignee of the present invention. Alternatively, the PP-SCSI interface adapter circuit 56*a* can be implemented using the EPSA-II chip available from Shuttle Technology, Inc., 43218 Christy Street, Fremont, Calif. 94538, or the RT90C20 chip from Rancho Technology, Inc., 10783 Bell Court, Rancho Cucamonga, Calif. 91730. As yet another alternative, a two chip solution can be implemented using any one of the following parallel port-to-ISA/IDE interface chips in conjunction with a standard ISA/IDE-to-SCSI interface chip, such as the 53C80 available from NCR Corporation, 1635 Aeroplaza Drive, Colorado Springs, Colo. 80916; the 50772B available from Microsolutions, 132 West Lincoln Highway, DeKalb, Ill. 60115, the SMC34C60 available from Standard Microsystems Corporation, 2107 North First Street, Suite 660, San Jose, Calif. 95131, and the CPX-FDI available from Shuttle Technology, Inc. Any of the aforementioned devices can be used to communicate SCSI commands to a SCSI device across a parallel port bus. These devices are typically supplied with an appropriate software driver that provides the proper communication link between the host operating system and the interface adapter circuit. The adapter circuit then provides the necessary communication between itself and the interface bus (e.g. bus 60 of FIG. 2) of the peripheral device to which it is connected. As can be appreciated, depending on the particular PP-SCSI adapter circuit employed, modifications may be required to ensure proper interface to the Host, Device and Pass-through I/O Controllers 50, 58, 74. It should be noted that some of the aforementioned PP-SCSI adapter solutions only provide pass-through support for printer devices; that is, only a printer can be connected to the pass-through bus as a third device. Additionally, it should be noted that parity is not provided on the intermediate and pass-through buses 44, 72 when the multiple interface input/output port 40 is in parallel port mode. Consequently, the PP-SCSI interface adapter must generate parity internally in order to provide parity to the peripheral interface bus 60.

Three-way SCSI-SCSI Repeater circuit

Figure 12A:
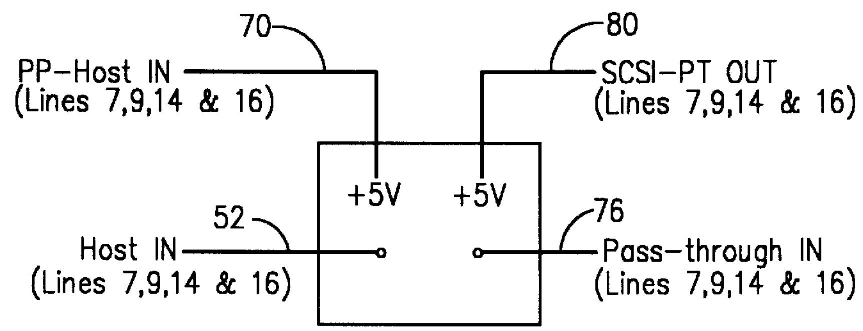
FIGS. 12(*a*) and 12(*b*) illustrate further details of the SCSI-to-SCSI repeater circuit of FIG. 2 in accordance with a preferred embodiment of the present invention.
Figure 12B:
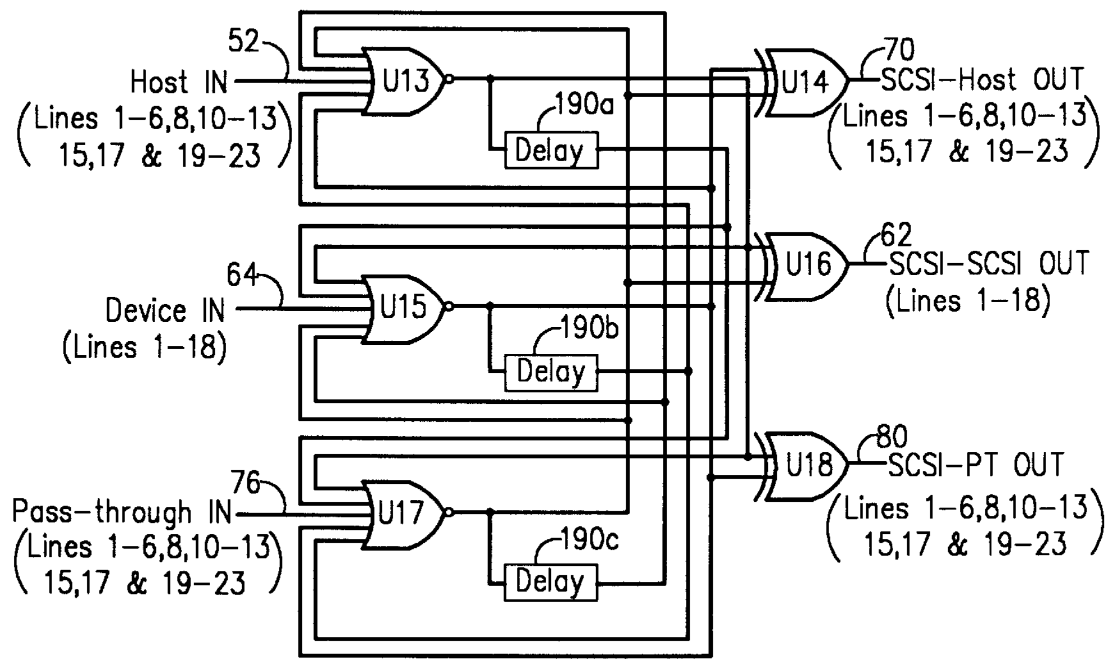

FIGS. 12(*a*) and 12(*b*) provide further details of the SCSI-to-SCSI repeater circuit 54 of FIG. 2. As illustrated in FIG. 12(*a*), lines 7, 9, 14 and 16 of the SCSI-Host OUT and SCSI-PT OUT buses 70 and 80 are tied high (+5V). This causes these lines to enable the respective line driver outputs 208, 208' in the Host and Pass-though I/O Control blocks 50, 74 when the multiple interface input/output port 40 is in the SCSI mode (See FIGS. 4 & 5). As a result, the corresponding lines 7, 9, 14 and 16 of the intermediate (host) bus 44 and the pass-through bus 72 will be coupled to ground through the "0" inputs of their respective multiplexers 202 (See FIGS. 4 & 5). As further shown in FIG. 12(*a*), lines 7, 9, 14 and 16 of the HostIN and Pass-throughIN buses 52, 76 are open-circuited in the SCSI-SCSI repeater circuit 54 since they are defined as rounds in accordance with the SCSI-2 protocol and therefore do not carry any information content.

The SCSI-to-SCSI repeater circuit 54 allows undirected, bi-directional flow of signals between the interface bus of the host computer (i.e., intermediate bus 44), the peripheral interface bus 60, and the interface bus of a device connected to the pass-through bus 72 when each of the buses is a SCSI bus (e.g., SCSI-2). Essentially, the control and data lines of the SCSI bus, which would normally be wired straight through from device to device, are opened and buffered in the SCSI-SCSI repeater circuit 54. The repeater circuit 54 allows the first bus signal asserted on the HostIN, DeviceIN or Pass-throughIN buses 52, 64, 76 to control the output buses (SCSI-HostOUT 70, SCSI-SCSI OUT 62, SCSI-PT OUT 80) corresponding to the other two input buses. All of the devices therefore appear connected to a single, continuous SCSI bus, as is normally the case.

FIG. 12(*b*) illustrates the three-way circuitry of the SCSI-SCSI repeater circuit 54 used to connect each of the eighteen data and control lines of the respective HostIN, DeviceIN and Pass-throughIN buses 52 to the respective lines of the SCSI-HostOUT, SCSI-SCSI OUT and SCSI-PT OUT buses 70, 62 and 80. Thus, the circuitry of FIG. 12(*b*) is repeated eighteen times in the SCSI-SCSI repeater circuit 54, once for each of the eighteen control and data lines.

The three-way circuitry of FIG. 12(*b*) comprises nine logic gates, i.e., NOR gates U13, U15 and U17, XOR gates U14, U16 and U18, and three delay gates, or elements, 190*a–c*. NOR gates U13, U15 and U17 monitor each of the three sources of incoming, active low signals on the respective lines of the HostIN, DeviceIN and Pass-throughIN buses 52, 64 and 76, respectively. XOR gates U14, U16 and U18 drive the respective lines of the SCSI-Host OUT, SCSI-SCSI OUT and SCSI-PT OUT buses 70, 62 and 80. For example, line 1 of each of the HostIN, DeviceIN and Pass-throughIN buses 52, 64 and 76 would be connected to NOR gates U13, U15 and U17, respectively, in a first implementation of the three-way circuitry of FIG. 12(*b*). XOR gates U14, U16 and U18 of that first implementation would each be connected to line 1 of the respective output bus 70, 62 or 80. A second implementation of the three-way circuitry would be used to interconnect line 2 of each of the HostIN, DeviceIN and Pass-throughIN buses 52, 64, 76 to line 2 of each of the corresponding SCSI-Host OUT, SCSI-SCSI OUT and SCSI-PT OUT buses 70, 62 and 80, and so on. It should be noted that lines 1–6, 8, 10–13, 15, 17 and 19–23 of the HostIN and Pass-throughIN buses 52, 76 correspond one-for-one to lines 1–18 of the DeviceIn bus 64. That is, lines 1–6 of the HostIN and Pass-throughIN buses 52, 76 correspond directly to lines 1–6 of the DeviceIN bus, line 8 of the HostIN and Pass-throughIN buses correspond to line 7 of the DeviceIN bus, lines 10–13 of the HostIN and Pass-throughIN buses correspond to lines 8–11 of the DeviceIN bus, and so on.

The XOR gates U14, U16, U18 provide active high signals on the SCSI-Host OUT, SCSI-SCSI Out and SCSI-PT OUT buses 70, 62, 80 which, in turn, enable the appropriate outputs in the Host, Device and Pass-through I/O Control blocks to effectively convert the active high signals into active low signals on the intermediate, peripheral and pass-through buses 44, 60 and 72. Delay gates 190*a–c* delay the re-arming of the NOR gates to prevent latch ups.

The operation of gates U13, U14 and 190*a* will now be described in detail, it being understood that the operation of gates U15, U16 and 190*b* and of gates U17, U18 and 190*c* is the same. To begin, assume that all three inputs to NOR gates U13, U15 and U17 are inactive, i.e., the corresponding lines of the HostIN, DeviceIN, and Pass-throughIN buses 52, 64, 76 are high (logic 1). The outputs of the NOR gates, the XOR gates U14, U16, U18 and all delay gates 190*a–c* will be low (logic 0). The output of NOR gate U13 is low since the HostIN line to which it is connected is high; the other four inputs to NOR gate U13 are low. When the HostIN line goes low, i.e., the host computer asserts that line, the output of NOR gate U13 will go high. The high output of NOR gate U13 will, in turn, drive the corresponding lines of the SCSI-SCSI OUT and SCSI-PT OUT buses 62, 80 high via XOR gates U16 and U18. The active high outputs of XOR gates U16 and U18 will, in turn, enable the appropriate output drivers in the Device and Pass-through I/O Control blocks 58, 74 to drive the corresponding lines of the peripheral and pass-through buses 60 and 72 low. Thus, the line asserted by the host computer will be "redriven" through the SCSI-SCSI repeater circuit 54 on the peripheral and pass-through buses 60, 72.

The new state (low) of the peripheral bus 60 and pass-through bus 72 will be imposed at the inputs of NOR gates U15 and U17 since, as explained above, signals asserted on the peripheral and pass-through buses 60, 72 are always allowed to pass freely to the DeviceIN and Pass-throughIN buses 64 and 76 through the respective inputs 206', 206" of the Device and Pass-through I/O Control blocks 58, 74 (FIGS. 5 & 6). However, even though these inputs to NOR gates U15 and U17 are now low, the outputs of NOR gates U15 and U17 will not change because they are disabled by the outputs of NOR gate U13 and delay gate 190*a,* both of which are connected to other inputs of each NOR gate U15, U17. The circuit will therefore stabilize with a logic high out of gates U13, U16 and U18 and delay gate 190*a*.

When the HostIN line that feeds NOR gate U13 is no longer asserted and returns to an inactive state (high), the output of NOR gate U13 goes low. This low signal is applied to the inputs of XOR gates U16 and U18 and to the inputs of NOR gates U15 and U17. The outputs of XOR gates U16 and U18 will therefore go low, effectively releasing the corresponding line of the peripheral and pass-through buses 60, 72, which therefore return to high. The outputs of NOR gates U15 and U17 are kept low during the transition by the high output of delay gate 190*a*. Delay gate 190*a* maintains a high output until the peripheral and pass-through buses 60, 72 and, consequently, the DeviceIN and Pass-through in buses 64, 76, are released (go high) by their associated drivers which, as explained above, are controlled by the outputs of XOR gates U16 and U18. It has been found that the delay of each delay gate 190*a–c* required for proper operation of the three-way circuitry is:

$$t_{od}+t_{bus}+t_r+t_{PLH}$$

where,

- $t_{od}$ is the delay time through the SCSI bus driver in the relevant Host, Device or Pass-through I/O Control block 50, 58, 74 (i.e., delay through AND gate 204 and buffer 208 in FIG. 4, 5 or 6);
- $t_{bus}$ is the time from release of the relevant host (intermediate), peripheral or pass-through bus 44, 60, 72 until the voltage on that bus rises to 2.4 volts;
- $t_r$ is the delay time through the SCSI bus receiver in the relevant Host, Device or Pass-through I/O Control block 50, 58, 74 (i.e., delay through buffer 206 in FIG. 4, 5 or 6); and
- $t_{PLH}$ is the propagation delay, low to high, through the relevant NOR gate U13, U15 or U17. As can be appreciated, these values may differ based on a number of factors and will depend on the particular implementation of each gate and buffer.

The three-way circuitry of FIG. 12(*b*) operates in the same way for each line of the HostIN, DeviceIN and Pass-throughIN buses. As can be appreciated, therefore, the SCSI-SCSI repeater circuit 54 allows the first device (i.e., Host, Peripheral or Pass-through) to assert a signal on either the HostIN, DeviceIN or Pass-throughIN bus 52, 64, 76 to control the output buses (SCSI-HostOUT 70, SCSI-SCSI OUT 62 or SCSI-PT OUT 80) corresponding to the other two input buses. All of the devices therefore appear connected to a single, continuous SCSI bus.

As the foregoing illustrates, the present invention is directed to a multiple interface input/output port for a peripheral device that is capable of automatically detecting the type of interface bus to which it is connected in a host computer and then routing communications between the two devices through an appropriate interface adapter, if necessary, in a manner transparent to the user. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A peripheral device having apparatus that enables communication between an interface bus of the peripheral device and any one of a plurality of different types of interface buses that may be provided in a host computer, each of said different types of interface buses comprising a plurality of lines, said apparatus comprising:

a connector;

an interface bus detection circuit electrically coupled to said connector and operable, upon connection of said connector to an interface bus of said host computer, to detect the type of the interface bus to which the connector is connected based upon characteristics of selected lines of each of said plurality of different types of interface buses wherein said selected lines have a purpose other than bus type identification; and a plurality of interface adapters each electrically coupled between said connector and the interface bus of the peripheral device, each of said interface adapters being operable to enable communication between the interface bus of said peripheral device and a respective one of said plurality of different types of interface buses that may be provided in said host computer, communications between the host computer and the peripheral device being routed through one of said interface adapters based upon the detected type of the interface bus to which said connector is connected.

2. The peripheral device of claim 1 further comprising means responsive to said interface bus detection circuit for routing data communicated between the interface bus of the peripheral device and the detected interface bus of the host computer through said one interface adapter.

3. The peripheral device of claim 1 wherein the interface bus of the peripheral device comprises a Small Computer Systems Interface (SCSI) bus.

4. The peripheral device of claim 1 wherein said plurality of different types of interface buses that may be provided in said host computer comprises at least a parallel port interface bus and a SCSI bus.

5. The peripheral device of claim 1 wherein one of said interface adapters comprises a repeater circuit that is enabled when the interface bus of the peripheral device is of the same type as the detected interface bus of the host computer, said repeater circuit operating to redrive signals transmitted between the interface buses of the peripheral device and the host computer.

6. The peripheral device of claim 1 wherein each of said plurality of different types of interface buses is characterized in that predetermined ones of the lines of the interface bus are grounded, each of the different types of interface buses having different ones of its lines grounded, and further wherein said interface bus detection circuit comprises:

means for comparing signal levels on selected ones of the lines of the host interface bus to which the connector is connected to a reference potential to determine which of said selected lines is grounded; and means for indicating the type of said interface bus based on the determination of which of its lines are grounded.

7. The peripheral device of claim 6 wherein said plurality of different types of interface buses comprises a SCSI bus and a parallel port interface bus, and wherein each of said different interface buses comprises at least twenty-five lines numbered consecutively, and further wherein said comparing means comprises four voltage comparators coupled respectively to the lines numbered 14, 16, 19 and 25 of the host interface bus for comparing voltage levels on each of said lines 14, 16, 19 and 25 to a reference potential to determine if said lines are grounded.

8. The peripheral device of claim 7 wherein said indicating means indicates that the host interface bus is a SCSI bus when lines 14 and 16 are determined by said comparators to be grounded, and wherein said indicating means indicates that the host interface bus is a parallel port interface bus when either (i) line 25 is determined to be grounded or (ii) line 19 is determined to be grounded, and at least one of lines 14 and 16 are determined not to be grounded.

9. The peripheral device of claim 6 wherein said plurality of different types of interface buses comprises a SCSI bus and a parallel port interface bus, and wherein each of said different interface buses comprises at least twenty-five lines numbered consecutively, and further wherein said comparing means comprises a voltage comparator coupled to the line numbered 25 of the host interface bus for comparing a voltage level on line 25 to a reference potential to determine if line 25 is grounded.

10. The peripheral device of claim 9 wherein said indicating means indicates that the host interface bus is a SCSI bus when line 25 thereof is determined by said comparator not to be grounded, and indicates that the host interface bus is a parallel port interface bus when line 25 thereof is determined by said comparator to be grounded.

11. The peripheral device of claim 1 further comprising a pass-through bus for enabling communication between a third device and said host computer through said peripheral device.

12. The peripheral device of claim 1 further comprising an intermediate bus to which said connector is electrically connected, said interface bus detection circuit and each of said plurality of interface adapters being coupled to said connector via said intermediate bus, said intermediate bus serving as an extension of the interface bus of said host computer to which the connector is connected.

13. A peripheral device having a Small Computer Systems Interface (SCSI) bus for communicating with a host computer, and having apparatus for enabling communication between the SCSI bus of the peripheral device and an interface bus of the host computer, wherein the interface bus of the host computer may comprise either a SCSI bus or a parallel port interface bus, each of which comprises a plurality of lines, said apparatus comprising:

a connector;

an interface bus detection circuit electrically coupled to said connector and operable, upon connection of said connector to an interface bus of said host computer, to detect whether the interface bus of the host computer comprises a SCSI bus or a parallel port interface bus, based upon characteristics of selected lines of each of said SCSI and parallel port buses wherein said selected lines have a purpose other than bus type identification;

a Parallel Port-to-SCSI (PP-SCSI) adapter electrically coupled between said connector and the SCSI bus of the peripheral device for enabling communication between the SCSI bus of the peripheral device and the interface bus of the host computer when the interface bus of the host computer is detected to be a parallel port interface bus; and a repeater circuit operable to redrive signals transmitted, via said connector, between the SCSI bus of the peripheral device and the interface bus of the host computer when the interface bus of the host computer is detected to be a SCSI bus.

14. The peripheral device of claim 13 further comprising means responsive to said interface bus detection circuit for routing data communicated between the interface bus of the peripheral device and the interface bus of the host computer to which it is connected through one of said PP-SCSI adapter and said repeater circuit.

15. The peripheral device of claim 13 wherein the SCSI and parallel port interface buses of the host computer are each characterized in that, for each interface bus, different ones of the lines of the interface bus are grounded, and further wherein said interface bus detection circuit comprises:

means for comparing signal levels on selected ones of the lines of the host interface bus to which the connector is connected to a reference potential to determine which of said selected lines is grounded; and means for indicating whether said host interface bus is a SCSI bus or a parallel port interface bus based on the determination of which of its lines are grounded.

16. The peripheral device of claim 15 wherein said SCSI and parallel port interface buses each comprises at least twenty-five lines numbered consecutively, and further wherein said comparing means comprises four voltage comparators coupled respectively to the lines numbered 14, 16, 19 and 25 for comparing voltage levels on each of said lines 14, 16, 19 and 25 to a reference potential to determine if said lines are grounded.

17. The peripheral device of claim 16 wherein said indicating means indicates that the host interface bus to which the connector is connected comprises a SCSI bus when lines 14 and 16 are determined by said comparators to be grounded, and wherein said indicating means indicates that the host interface bus comprises a parallel port interface bus when either (i) line 25 of the host interface bus is determined to be grounded or (ii) line 19 is determined to be grounded, and at least one of lines 14 and 16 are determined not to be grounded.

18. The peripheral device of claim 15 wherein said SCSI and parallel port interface buses each comprises at least twenty-five lines numbered consecutively, and further wherein said comparing means comprises a voltage comparator coupled to the line numbered 25 for comparing a voltage level on line 25 to a reference potential to determine if line 25 is grounded.

19. The peripheral device of claim 18 wherein said indicating means indicates that the host interface bus to which the connector is connected comprises a SCSI bus when line 25 thereof is determined by said comparator not to be grounded, and indicates that the host interface bus comprises a parallel port interface bus when line 25 thereof is determined by said comparator to be grounded.

20. The peripheral device of claim 1 further comprising a pass-through bus for enabling communication between a third device and said host computer through said peripheral device.

21. The peripheral device of claim 1 further comprising an intermediate bus to which said connector is electrically connected, said interface bus detection circuit, said repeater circuit and said PP-SCSI adapter each being coupled to said connector via said intermediate bus, said intermediate bus serving as an extension of the interface bus of said host computer when said connector is connected thereto.

22. The circuit of claim 21, wherein each of said plurality of known different types of interface buses is characterized in that predetermined ones of the lines of the interface bus are grounded, each of the different types of interface buses having different combinations of its lines grounded, and wherein said means for comparing characteristics comprises means for comparing signal levels on the selected ones of the lines of said interface bus to a reference potential to determine which of said selected lines are grounded and further wherein said means for indicating indicates the type of said interface bus based on the determination of which of its lines are grounded.

23. The circuit of claim 22 wherein the interface bus comprises twenty-five lines numbered consecutively, and wherein said plurality of different types of interface buses comprises a parallel port interface bus and a SCSI bus, and further wherein said comparing means comprises four voltage comparators coupled respectively to the lines numbered 14, 16, 19 and 25 of the interface for comparing voltage levels on each of said lines 14, 16, 19 and 25 to a reference potential to determine which of said lines is grounded.

24. The circuit of claim 23 wherein said indicating means indicates that the interface bus is a SCSI bus when lines 14 and 16 are determined by said comparing means to be grounded, and wherein said indicating means indicates that the interface bus is a parallel port interface bus when either (i) line 25 is determined to be grounded, or (ii) line 19 is determined to be grounded and at least one of lines 14 and 16 is determined not to be grounded.

25. The circuit of claim 22 wherein the interface bus comprises twenty-five lines numbered consecutively, and wherein said plurality of different types of interface buses comprises a parallel port interface bus and a SCSI bus, and further wherein said comparing means comprises a voltage comparator coupled to the line numbered 25 for comparing a voltage level on line 25 to a reference potential to determine whether line 25 is grounded.

26. The circuit of claim 25 wherein said indicating means indicates that the interface bus is a SCSI bus when line 25 is determined by said comparator not to be grounded, and said indicating means indicates that the interface bus test is a parallel port interface bus when line 25 is determined by said comparator to be grounded.

27. The method of claim 26, wherein each of said plurality of known types of interface buses is characterized in that predetermined ones of the lines of the interface bus are grounded, each of the different types of interface buses having different combinations of its lines grounded, and wherein said comparing step comprises comparing signal levels on selected ones of the lines of said interface bus to a reference potential to determine which of said selected lines are grounded, and further wherein said indicating step comprises indicating the type of said interface bus based on the determination of which of its lines are grounded.

28. The method of claim 27 wherein the interface bus comprises twenty-five lines numbered consecutively, and wherein said plurality of different types of interface buses comprises a parallel port interface bus and a SCSI bus, and further wherein said comparing step comprises comparing voltage levels on each of lines 14, 16, 19 and 25 of the interface bus to a reference potential to determine which of said lines 14, 16, 19 and 25 is grounded.

29. The method of claim 28 wherein said indicating steps comprises indicating that the interface bus is a SCSI bus when lines 14 and 16 are determined to be grounded, and indicating that the interface bus is a parallel port interface bus when either (i) line 25 is determined to be grounded, or (ii) line 19 is determined to be grounded and at least one of lines 14 and 16 is determined not to be grounded.

30. The method of claim 27 wherein the interface bus comprises twenty-five lines numbered consecutively, and wherein said plurality of different types of interface buses comprises a parallel port interface bus and a SCSI bus, and further wherein said comparing step comprises comparing a voltage level on line 25 of the interface bus to a reference potential to determine whether line 25 is grounded.

31. The method of claim 30 wherein said indicating step comprises indicating that the interface bus is a SCSI bus when line 25 is determined not to be grounded, and indicating that the interface bus is a parallel port interface bus when line 25 is determined by said comparator to be grounded.

32. A circuit for identifying an interface bus from a plurality of different known types of interface buses, each of said plurality of different known types of interface buses comprising a plurality of lines, the lines of each different type of interface bus having known characteristics that distinguish said each different type of interface bus from the others of said plurality of different types of interface buses, said circuit comprising:

means for comparing characteristics of selected ones of the lines of said interface bus to the known characteristics of those lines for each of said different types of interface buses wherein said selected ones of the lines have a characteristic other than bus type identification; and means for indicating the type of said interface bus based on the comparison of said known characteristics.

33. A method of identifying an interface bus from a plurality of different known types of interface buses, each of said plurality of different known types of interface buses comprising a plurality of lines, the lines of each different type of interface bus having known characteristics that distinguish said each different type of interface bus from the others of said plurality of different types of interface buses, said method comprising the steps of:

comparing characteristics of selected ones of the lines of said interface bus to the known characteristics of those lines for each of said different types of interface buses wherein said selected ones of the lines have a characteristic other than bus type identification; and indicating the type of said interface bus based on the comparison of said known characteristics.

* * * * *